(12) United States Patent
Raman et al.

(10) Patent No.: US 9,353,322 B2
(45) Date of Patent: *May 31, 2016

(54) HYDROMETHANATION OF A CARBONACEOUS FEEDSTOCK

(75) Inventors: Pattabhi K. Raman, Kildeer, IL (US); Veeraya Jiradilok, Chicago, IL (US); Earl T. Robinson, Lakeland, FL (US); Avinash Sirdeshpande, Chicago, IL (US)

(73) Assignee: GreatPoint Energy, Inc., Cambridge, MA (US)

( * ) Notice: Subject to any disclaimer, the term of this patent is extended or adjusted under 35 U.S.C. 154(b) by 1131 days.

This patent is subject to a terminal disclaimer.

(21) Appl. No.: 13/284,139

(22) Filed: Oct. 28, 2011

(65) Prior Publication Data

US 2012/0102836 A1    May 3, 2012

Related U.S. Application Data

(60) Provisional application No. 61/408,924, filed on Nov. 1, 2010.

(51) Int. Cl.
*C10L 3/08*    (2006.01)
*C10J 3/46*    (2006.01)
(Continued)

(52) U.S. Cl.
CPC .............. *C10J 3/463* (2013.01); *C01B 3/586* (2013.01); *C01B 31/18* (2013.01); *C01B 31/20* (2013.01); *C10L 3/08* (2013.01); *C01B 2203/0283* (2013.01); *C01B 2203/042* (2013.01); *C01B 2203/043* (2013.01); *C01B 2203/0405* (2013.01); *C01B 2203/047* (2013.01); *C01B 2203/0415* (2013.01); *C01B 2203/0445* (2013.01); *C01B 2203/0465* (2013.01); *C01B 2203/0475* (2013.01); *C01B 2203/0485* (2013.01); *C01B 2203/0495* (2013.01); *C01B 2203/147* (2013.01); *C10J 2300/093* (2013.01); *C10J 2300/0973* (2013.01); *C10J 2300/0986* (2013.01);
(Continued)

(58) Field of Classification Search
None
See application file for complete search history.

(56) References Cited

U.S. PATENT DOCUMENTS 2,605,215 A    7/1952   Coghlan
2,694,623 A    11/1954  Welty, Jr. et al.
(Continued)

FOREIGN PATENT DOCUMENTS

CA    996353 A1    3/1973
CA    966660       4/1975
(Continued)

OTHER PUBLICATIONS

"Detailed Coal Specifications", Quality Guidelines for Energy System Studies, National Energy Technology Laboratory, U.S. Department of Energy, Jan. 2012.*
(Continued)

*Primary Examiner* — In Suk Bullock
*Assistant Examiner* — Ali Z Fadhel
(74) *Attorney, Agent, or Firm* — McDonnell Boehnen Hulbert & Berghoff LLP

(57) ABSTRACT

The present invention relates to processes for hydromethanating a carbonaceous feedstock to a methane-enriched synthesis gas, where an oxygen-rich gas stream and the carbonaceous feedstock are fed into a fluidized-bed hydromethanation reactor at a specified zone in order to assist in heat management within the hydromethanation reactor.

18 Claims, 2 Drawing Sheets

(51) Int. Cl.
*C01B 3/58* (2006.01)
*C01B 31/18* (2006.01)
*C01B 31/20* (2006.01)

(52) U.S. Cl.
CPC .. *C10J2300/1807* (2013.01); *C10J 2300/1838* (2013.01)

(56) References Cited

U.S. PATENT DOCUMENTS

| | | |
|---|---|---|
| 2,791,549 A | 5/1957 | Jahnig |
| 2,813,126 A | 11/1957 | Tierney |
| 2,860,959 A | 11/1958 | Pettyjohn et al. |
| 2,886,405 A | 5/1959 | Benson et al. |
| 3,034,848 A | 5/1962 | King |
| 3,114,930 A | 12/1963 | Oldham et al. |
| 3,150,716 A | 9/1964 | Strelzoff et al. |
| 3,164,330 A | 1/1965 | Neidl |
| 3,351,563 A | 11/1967 | Negra et al. |
| 3,435,590 A | 4/1969 | Smith |
| 3,531,917 A | 10/1970 | Grunewald et al. |
| 3,544,291 A | 12/1970 | Schlinger et al. |
| 3,594,985 A | 7/1971 | Ameen et al. |
| 3,615,300 A | 10/1971 | Holm et al. |
| 3,689,240 A | 9/1972 | Aldridge et al. |
| 3,740,193 A | 6/1973 | Aldridge et al. |
| 3,746,522 A | 7/1973 | Donath |
| 3,759,036 A | 9/1973 | White |
| 3,779,725 A | 12/1973 | Hegarty et al. |
| 3,814,725 A | 6/1974 | Zimmerman et al. |
| 3,817,725 A | 6/1974 | Sieg et al. |
| 3,828,474 A | 8/1974 | Quartulli |
| 3,833,327 A | 9/1974 | Pitzer et al. |
| 3,847,567 A | 11/1974 | Kalina et al. |
| 3,876,393 A | 4/1975 | Kasai et al. |
| 3,904,386 A * | 9/1975 | Graboski ............... C07C 1/0485 423/656 |
| 3,915,670 A | 10/1975 | Lacey et al. |
| 3,920,229 A | 11/1975 | Piggott |
| 3,929,431 A | 12/1975 | Koh et al. |
| 3,958,957 A | 5/1976 | Koh et al. |
| 3,966,875 A | 6/1976 | Bratzler et al. |
| 3,969,089 A | 7/1976 | Moss et al. |
| 3,971,639 A | 7/1976 | Matthews |
| 3,972,693 A | 8/1976 | Wiesner et al. |
| 3,975,168 A | 8/1976 | Gorbaty |
| 3,985,519 A * | 10/1976 | Kalina et al. .................. 48/202 |
| 3,989,811 A | 11/1976 | Hill |
| 3,996,014 A | 12/1976 | Muller et al. |
| 3,998,607 A | 12/1976 | Wesswlhoft et al. |
| 3,999,607 A | 12/1976 | Pennington et al. |
| 4,005,996 A | 2/1977 | Hausberger et al. |
| 4,011,066 A | 3/1977 | Bratzler et al. |
| 4,017,272 A | 4/1977 | Anwer et al. |
| 4,021,370 A | 5/1977 | Harris et al. |
| 4,025,423 A | 5/1977 | Stonner et al. |
| 4,044,098 A | 8/1977 | Miller et al. |
| 4,046,523 A | 9/1977 | Kalina et al. |
| 4,052,176 A | 10/1977 | Child et al. |
| 4,053,554 A | 10/1977 | Reed et al. |
| 4,057,512 A | 11/1977 | Vadovic et al. |
| 4,069,304 A | 1/1978 | Starkovich et al. |
| 4,077,778 A | 3/1978 | Nahas et al. |
| 4,091,073 A | 5/1978 | Winkler |
| 4,092,125 A | 5/1978 | Stambaugh et al. |
| 4,094,650 A | 6/1978 | Koh et al. |
| 4,100,256 A | 7/1978 | Bozzelli et al. |
| 4,101,449 A | 7/1978 | Noda et al. |
| 4,104,201 A | 8/1978 | Banks et al. |
| 4,113,615 A | 9/1978 | Gorbaty |
| 4,116,996 A | 9/1978 | Huang |
| 4,118,204 A | 10/1978 | Eakman et al. |
| 4,152,119 A | 5/1979 | Schulz |
| 4,157,246 A | 6/1979 | Eakman et al. |
| 4,159,195 A | 6/1979 | Clavenna |
| 4,162,902 A | 7/1979 | Wiesner et al. |
| 4,173,465 A | 11/1979 | Meissner et al. |
| 4,189,307 A | 2/1980 | Marion |
| 4,193,771 A | 3/1980 | Sharp et al. |
| 4,193,772 A | 3/1980 | Sharp |
| 4,200,439 A | 4/1980 | Lang |
| 4,204,843 A | 5/1980 | Neavel |
| 4,211,538 A | 7/1980 | Eakman et al. |
| 4,211,669 A | 7/1980 | Eakman et al. |
| 4,219,338 A | 8/1980 | Wolfs et al. |
| 4,223,728 A | 9/1980 | Pegg |
| 4,225,457 A | 9/1980 | Schulz |
| 4,235,044 A | 11/1980 | Cheung |
| 4,243,639 A | 1/1981 | Haas et al. |
| 4,249,471 A | 2/1981 | Gunnerman |
| 4,252,771 A | 2/1981 | Lagana et al. |
| 4,260,421 A | 4/1981 | Brown et al. |
| 4,265,868 A | 5/1981 | Kamody |
| 4,270,937 A | 6/1981 | Adler et al. |
| 4,284,416 A | 8/1981 | Nahas |
| 4,292,048 A | 9/1981 | Wesselhoft et al. |
| 4,298,584 A | 11/1981 | Makrides |
| 4,315,753 A | 2/1982 | Bruckenstein et al. |
| 4,315,758 A | 2/1982 | Patel et al. |
| 4,318,712 A | 3/1982 | Lang et al. |
| 4,322,222 A | 3/1982 | Sass |
| 4,330,305 A | 5/1982 | Kuessner et al. |
| 4,331,451 A | 5/1982 | Isogaya et al. |
| 4,334,893 A | 6/1982 | Lang |
| 4,336,034 A | 6/1982 | Lang et al. |
| 4,336,233 A | 6/1982 | Appl et al. |
| 4,341,531 A | 7/1982 | Duranleau et al. |
| 4,344,486 A | 8/1982 | Parrish |
| 4,347,063 A | 8/1982 | Sherwood et al. |
| 4,348,486 A | 9/1982 | Calvin et al. |
| 4,348,487 A | 9/1982 | Calvin et al. |
| 4,353,713 A | 10/1982 | Cheng |
| 4,365,975 A | 12/1982 | Williams et al. |
| 4,372,755 A | 2/1983 | Tolman et al. |
| 4,375,362 A | 3/1983 | Moss |
| 4,385,905 A | 5/1983 | Tucker |
| 4,397,656 A | 8/1983 | Ketkar |
| 4,400,182 A | 8/1983 | Davies et al. |
| 4,407,206 A | 10/1983 | Bartok et al. |
| 4,428,535 A | 1/1984 | Venetucci |
| 4,432,773 A | 2/1984 | Euker, Jr. et al. |
| 4,433,065 A | 2/1984 | Van Der Burgt et al. |
| 4,436,028 A | 3/1984 | Wilder |
| 4,436,531 A | 3/1984 | Estabrook et al. |
| 4,439,210 A | 3/1984 | Lancet |
| 4,443,415 A | 4/1984 | Queneau et al. |
| 4,444,568 A | 4/1984 | Beisswenger et al. |
| 4,459,138 A | 7/1984 | Soung |
| 4,462,814 A | 7/1984 | Holmes et al. |
| 4,466,828 A | 8/1984 | Tamai et al. |
| 4,468,231 A | 8/1984 | Bartok et al. |
| 4,478,425 A | 10/1984 | Benko |
| 4,478,725 A | 10/1984 | Velling et al. |
| 4,482,529 A | 11/1984 | Chen et al. |
| 4,491,609 A | 1/1985 | Degel et al. |
| 4,497,784 A | 2/1985 | Diaz |
| 4,500,323 A | 2/1985 | Siegfried et al. |
| 4,505,881 A | 3/1985 | Diaz |
| 4,508,544 A | 4/1985 | Moss |
| 4,508,693 A | 4/1985 | Diaz |
| 4,515,604 A | 5/1985 | Eisenlohr et al. |
| 4,515,764 A | 5/1985 | Diaz |
| 4,524,050 A | 6/1985 | Chen et al. |
| 4,540,681 A | 9/1985 | Kustes et al. |
| 4,541,841 A | 9/1985 | Reinhardt |
| 4,551,155 A | 11/1985 | Wood et al. |
| 4,558,027 A | 12/1985 | McKee et al. |
| 4,572,826 A | 2/1986 | Moore |
| 4,594,140 A | 6/1986 | Cheng |
| 4,597,775 A | 7/1986 | Billimoria et al. |
| 4,597,776 A | 7/1986 | Ullman et al. |
| 4,604,105 A | 8/1986 | Aquino et al. |
| 4,609,388 A | 9/1986 | Adler et al. |
| 4,609,456 A | 9/1986 | Deschamps et al. |

(56) References Cited

U.S. PATENT DOCUMENTS

| | | | |
|---|---|---|---|
| 4,617,027 A | 10/1986 | Lang |
| 4,619,864 A | 10/1986 | Hendrix et al. |
| 4,620,421 A | 11/1986 | Brown et al. |
| 4,661,237 A | 4/1987 | Kimura et al. |
| 4,668,428 A | 5/1987 | Najjar |
| 4,668,429 A | 5/1987 | Najjar |
| 4,675,035 A | 6/1987 | Apffel |
| 4,678,480 A | 7/1987 | Heinrich et al. |
| 4,682,986 A | 7/1987 | Lee et al. |
| 4,690,814 A | 9/1987 | Velenyi et al. |
| 4,696,678 A | 9/1987 | Koyama et al. |
| 4,699,632 A | 10/1987 | Babu et al. |
| 4,704,136 A | 11/1987 | Weston et al. |
| 4,720,289 A | 1/1988 | Vaugh et al. |
| 4,747,938 A | 5/1988 | Khan |
| 4,781,731 A | 11/1988 | Schlinger |
| 4,803,061 A | 2/1989 | Najjar et al. |
| 4,808,194 A | 2/1989 | Najjar et al. |
| 4,810,475 A | 3/1989 | Chu et al. |
| 4,822,935 A | 4/1989 | Scott |
| 4,848,983 A | 7/1989 | Tomita et al. |
| 4,854,944 A | 8/1989 | Strong |
| 4,861,346 A | 8/1989 | Najjar et al. |
| 4,861,360 A | 8/1989 | Apffel |
| 4,872,886 A | 10/1989 | Henley et al. |
| 4,876,080 A | 10/1989 | Paulson |
| 4,892,567 A | 1/1990 | Yan |
| 4,960,450 A | 10/1990 | Schwarz et al. |
| 4,995,193 A | 2/1991 | Soga et al. |
| 5,017,282 A | 5/1991 | Delbianco et al. |
| 5,055,181 A | 10/1991 | Maa et al. |
| 5,057,294 A | 10/1991 | Sheth et al. |
| 5,059,406 A | 10/1991 | Sheth et al. |
| 5,074,357 A | 12/1991 | Haines |
| 5,093,094 A | 3/1992 | Van Kleeck et al. |
| 5,094,737 A | 3/1992 | Bearden, Jr. et al. |
| 5,132,007 A | 7/1992 | Meyer et al. |
| 5,223,173 A | 6/1993 | Jeffrey |
| 5,225,044 A | 7/1993 | Breu |
| 5,236,557 A | 8/1993 | Muller et al. |
| 5,250,083 A | 10/1993 | Wolfenbarger et al. |
| 5,277,884 A | 1/1994 | Shinnar et al. |
| 5,388,645 A | 2/1995 | Puri et al. |
| 5,388,650 A | 2/1995 | Michael |
| 5,435,940 A | 7/1995 | Doering et al. |
| 5,536,893 A | 7/1996 | Gudmundsson |
| 5,566,755 A | 10/1996 | Seidle et al. |
| 5,616,154 A | 4/1997 | Elliott et al. |
| 5,630,854 A | 5/1997 | Sealock, Jr. et al. |
| 5,641,327 A | 6/1997 | Leas |
| 5,660,807 A | 8/1997 | Forg et al. |
| 5,669,960 A | 9/1997 | Couche |
| 5,670,122 A | 9/1997 | Zamansky et al. |
| 5,720,785 A | 2/1998 | Baker |
| 5,733,515 A | 3/1998 | Doughty et al. |
| 5,769,165 A | 6/1998 | Bross et al. |
| 5,776,212 A | 7/1998 | Leas |
| 5,788,724 A | 8/1998 | Carugati et al. |
| 5,855,631 A | 1/1999 | Leas |
| 5,865,898 A | 2/1999 | Holtzapple et al. |
| 5,968,465 A | 10/1999 | Koveal et al. |
| 6,013,158 A | 1/2000 | Wootten |
| 6,015,104 A | 1/2000 | Rich, Jr. |
| 6,028,234 A | 2/2000 | Heinemann et al. |
| 6,032,737 A | 3/2000 | Brady et al. |
| 6,090,356 A | 7/2000 | Jahnke et al. |
| 6,119,778 A | 9/2000 | Seidle et al. |
| 6,132,478 A | 10/2000 | Tsurui et al. |
| 6,180,843 B1 | 1/2001 | Heinemann et al. |
| 6,187,465 B1 | 2/2001 | Galloway |
| 6,379,645 B1 | 4/2002 | Bucci et al. |
| 6,389,820 B1 | 5/2002 | Rogers et al. |
| 6,419,888 B1 | 7/2002 | Wyckoff |
| 6,506,349 B1 | 1/2003 | Khanmamedov |
| 6,506,361 B1 | 1/2003 | Machado et al. |
| 6,602,326 B2 | 8/2003 | Lee et al. |
| 6,641,625 B1 | 11/2003 | Clawson et al. |
| 6,653,516 B1 | 11/2003 | Yoshikawa et al. |
| 6,692,711 B1 | 2/2004 | Alexion et al. |
| 6,790,430 B1 | 9/2004 | Lackner et al. |
| 6,797,253 B2 | 9/2004 | Lyon |
| 6,808,543 B2 | 10/2004 | Paisley |
| 6,830,597 B1 | 12/2004 | Green |
| 6,855,852 B1 | 2/2005 | Jackson et al. |
| 6,878,358 B2 | 4/2005 | Vosteen et al. |
| 6,894,183 B2 | 5/2005 | Choudhary et al. |
| 6,955,595 B2 | 10/2005 | Kim |
| 6,955,695 B2 | 10/2005 | Nahas |
| 6,969,494 B2 | 11/2005 | Herbst |
| 7,074,373 B1 | 7/2006 | Warren et al. |
| 7,077,202 B2 | 7/2006 | Shaw et al. |
| 7,100,692 B2 | 9/2006 | Parsley et al. |
| 7,118,720 B1 | 10/2006 | Mendelsohn et al. |
| 7,132,183 B2 | 11/2006 | Galloway |
| 7,168,488 B2 | 1/2007 | Olsvik et al. |
| 7,205,448 B2 | 4/2007 | Gajda et al. |
| 7,220,502 B2 | 5/2007 | Galloway |
| 7,299,868 B2 | 11/2007 | Zapadinski |
| 7,309,383 B2 | 12/2007 | Beech, Jr. et al. |
| 7,481,275 B2 | 1/2009 | Olsvik et al. |
| 7,666,383 B2 | 2/2010 | Green |
| 7,677,309 B2 | 3/2010 | Shaw et al. |
| 7,758,663 B2 | 7/2010 | Rabovitser et al. |
| 7,897,126 B2 | 3/2011 | Rappas et al. |
| 7,901,644 B2 | 3/2011 | Rappas et al. |
| 7,922,782 B2 | 4/2011 | Sheth |
| 7,926,750 B2 | 4/2011 | Hauserman |
| 7,976,593 B2 | 7/2011 | Graham |
| 8,114,176 B2 * | 2/2012 | Nahas ..................... 48/127.3 |
| 8,114,177 B2 | 2/2012 | Hippo et al. |
| 8,123,827 B2 | 2/2012 | Robinson |
| 8,163,048 B2 | 4/2012 | Rappas et al. |
| 8,192,716 B2 | 6/2012 | Raman et al. |
| 8,202,913 B2 | 6/2012 | Robinson et al. |
| 8,268,899 B2 | 9/2012 | Robinson et al. |
| 8,286,901 B2 | 10/2012 | Rappas et al. |
| 8,297,542 B2 | 10/2012 | Rappas et al. |
| 8,328,890 B2 | 12/2012 | Reiling et al. |
| 8,349,037 B2 | 1/2013 | Steiner et al. |
| 8,349,039 B2 | 1/2013 | Robinson |
| 8,361,428 B2 | 1/2013 | Raman et al. |
| 8,366,795 B2 | 2/2013 | Raman et al. |
| 8,479,833 B2 | 7/2013 | Raman |
| 8,479,834 B2 | 7/2013 | Preston |
| 8,502,007 B2 | 8/2013 | Hippo et al. |
| 2002/0036086 A1 | 3/2002 | Minkkinen et al. |
| 2003/0070808 A1 | 4/2003 | Allison |
| 2003/0131582 A1 | 7/2003 | Anderson et al. |
| 2003/0167691 A1 | 9/2003 | Nahas |
| 2004/0020123 A1 | 2/2004 | Kimura et al. |
| 2004/0023086 A1 | 2/2004 | Su et al. |
| 2004/0123601 A1 | 7/2004 | Fan |
| 2004/0180971 A1 | 9/2004 | Inoue et al. |
| 2004/0256116 A1 | 12/2004 | Olsvik et al. |
| 2005/0107648 A1 | 5/2005 | Kimura et al. |
| 2005/0137442 A1 | 6/2005 | Gajda et al. |
| 2005/0192362 A1 | 9/2005 | Rodriguez et al. |
| 2005/0287056 A1 | 12/2005 | Baker et al. |
| 2005/0288537 A1 | 12/2005 | Maund et al. |
| 2006/0149423 A1 | 7/2006 | Barnicki et al. |
| 2006/0228290 A1 | 10/2006 | Green |
| 2006/0231252 A1 | 10/2006 | Shaw et al. |
| 2006/0265953 A1 | 11/2006 | Hobbs |
| 2006/0272813 A1 | 12/2006 | Olsvik et al. |
| 2007/0000177 A1 | 1/2007 | Hippo et al. |
| 2007/0051043 A1 | 3/2007 | Schingnitz |
| 2007/0083072 A1 | 4/2007 | Nahas |
| 2007/0180990 A1 | 8/2007 | Downs et al. |
| 2007/0186472 A1 | 8/2007 | Rabovitser et al. |
| 2007/0220810 A1 | 9/2007 | Leveson et al. |
| 2007/0227729 A1 | 10/2007 | Zubrin et al. |
| 2007/0237696 A1 | 10/2007 | Payton |
| 2007/0277437 A1 | 12/2007 | Sheth |
| 2007/0282018 A1 | 12/2007 | Jenkins |

(56) References Cited

U.S. PATENT DOCUMENTS

| | | |
|---|---|---|
| 2008/0141591 A1 | 6/2008 | Kohl |
| 2008/0289822 A1 | 11/2008 | Betzer Tsilevich |
| 2009/0012188 A1 | 1/2009 | Rojey et al. |
| 2009/0048476 A1 | 2/2009 | Rappas et al. |
| 2009/0090055 A1 | 4/2009 | Ohtsuka |
| 2009/0090056 A1 | 4/2009 | Ohtsuka |
| 2009/0165361 A1 | 7/2009 | Rappas et al. |
| 2009/0165376 A1 | 7/2009 | Lau et al. |
| 2009/0165379 A1 | 7/2009 | Rappas |
| 2009/0165380 A1 | 7/2009 | Lau et al. |
| 2009/0165381 A1 | 7/2009 | Robinson |
| 2009/0165382 A1 | 7/2009 | Rappas et al. |
| 2009/0165383 A1 | 7/2009 | Rappas et al. |
| 2009/0165384 A1 | 7/2009 | Lau et al. |
| 2009/0166588 A1 | 7/2009 | Spitz et al. |
| 2009/0169448 A1 | 7/2009 | Rappas et al. |
| 2009/0169449 A1 | 7/2009 | Rappas et al. |
| 2009/0170968 A1 | 7/2009 | Nahas et al. |
| 2009/0173079 A1 | 7/2009 | Wallace et al. |
| 2009/0217575 A1 | 9/2009 | Raman et al. |
| 2009/0217582 A1 | 9/2009 | May et al. |
| 2009/0217584 A1 | 9/2009 | Raman et al. |
| 2009/0217585 A1 | 9/2009 | Raman et al. |
| 2009/0217586 A1 | 9/2009 | Rappas et al. |
| 2009/0217587 A1 | 9/2009 | Raman et al. |
| 2009/0217588 A1 | 9/2009 | Hippo et al. |
| 2009/0217589 A1 | 9/2009 | Robinson |
| 2009/0217590 A1 | 9/2009 | Rappas et al. |
| 2009/0218424 A1 | 9/2009 | Hauserman |
| 2009/0220406 A1 | 9/2009 | Rahman |
| 2009/0229182 A1 | 9/2009 | Raman et al. |
| 2009/0235585 A1 | 9/2009 | Neels et al. |
| 2009/0236093 A1 | 9/2009 | Zubrin et al. |
| 2009/0246120 A1 | 10/2009 | Raman et al. |
| 2009/0259080 A1 | 10/2009 | Raman et al. |
| 2009/0260287 A1 | 10/2009 | Lau |
| 2009/0305093 A1 | 12/2009 | Biollaz et al. |
| 2009/0324458 A1 | 12/2009 | Robinson et al. |
| 2009/0324459 A1 | 12/2009 | Robinson et al. |
| 2009/0324460 A1 | 12/2009 | Robinson et al. |
| 2009/0324461 A1 | 12/2009 | Robinson et al. |
| 2009/0324462 A1 | 12/2009 | Robinson et al. |
| 2010/0018113 A1 | 1/2010 | Bohlig et al. |
| 2010/0050654 A1 | 3/2010 | Chiu et al. |
| 2010/0071235 A1 | 3/2010 | Pan et al. |
| 2010/0071262 A1 | 3/2010 | Robinson et al. |
| 2010/0076235 A1 | 3/2010 | Reiling et al. |
| 2010/0120926 A1 | 5/2010 | Robinson et al. |
| 2010/0121125 A1 | 5/2010 | Hippo et al. |
| 2010/0159352 A1 | 6/2010 | Gelin et al. |
| 2010/0168494 A1 | 7/2010 | Rappas et al. |
| 2010/0168495 A1 | 7/2010 | Rappas et al. |
| 2010/0179232 A1 | 7/2010 | Robinson et al. |
| 2010/0270506 A1* | 10/2010 | Goetsch .................. C10J 3/482 252/373 |
| 2010/0287835 A1 | 11/2010 | Reiling et al. |
| 2010/0287836 A1 | 11/2010 | Robinson et al. |
| 2010/0292350 A1 | 11/2010 | Robinson et al. |
| 2011/0031439 A1 | 2/2011 | Sirdeshpande et al. |
| 2011/0062012 A1 | 3/2011 | Robinson |
| 2011/0062721 A1 | 3/2011 | Sirdeshpande et al. |
| 2011/0062722 A1 | 3/2011 | Sirdeshpande et al. |
| 2011/0064648 A1 | 3/2011 | Preston et al. |
| 2011/0088896 A1 | 4/2011 | Preston |
| 2011/0088897 A1 | 4/2011 | Raman |
| 2011/0146978 A1 | 6/2011 | Perlman |
| 2011/0146979 A1 | 6/2011 | Wallace |
| 2011/0207002 A1 | 8/2011 | Powell et al. |
| 2011/0217602 A1 | 9/2011 | Sirdeshpande |
| 2011/0262323 A1 | 10/2011 | Rappas et al. |
| 2011/0294905 A1 | 12/2011 | Robinson et al. |
| 2012/0046510 A1 | 2/2012 | Sirdeshpande |
| 2012/0060417 A1 | 3/2012 | Raman et al. |
| 2012/0102836 A1 | 5/2012 | Raman et al. |
| 2012/0102837 A1 | 5/2012 | Raman et al. |
| 2013/0042824 A1 | 2/2013 | Sirdeshpande |
| 2013/0046124 A1 | 2/2013 | Sirdeshpande |
| 2013/0172640 A1 | 7/2013 | Robinson et al. |

FOREIGN PATENT DOCUMENTS

| | | |
|---|---|---|
| CA | 1003217 | 1/1977 |
| CA | 1041553 | 10/1978 |
| CA | 1106178 | 8/1981 |
| CA | 1 125 026 | 6/1982 |
| CA | 1187702 | 6/1985 |
| CA | 1282243 | 4/1991 |
| CA | 1299589 | 4/1992 |
| CA | 1332108 | 9/1994 |
| CA | 2673121 | 6/2008 |
| CA | 2713642 | 7/2009 |
| CN | 1477090 | 2/2004 |
| CN | 101555420 | 10/2009 |
| DE | 2 210 891 | 3/1972 |
| DE | 2210891 | 9/1972 |
| DE | 2852710 | 6/1980 |
| DE | 3422202 | 12/1985 |
| DE | 100610607 | 6/2002 |
| EA | 819 | 4/2000 |
| EP | 0 007 247 A1 | 1/1980 |
| EP | 0 024 792 A2 | 3/1981 |
| EP | 0024792 | 3/1981 |
| EP | 0 067 580 | 12/1982 |
| EP | 102828 | 3/1984 |
| EP | 0 138 463 | 4/1985 |
| EP | 0 225 146 | 6/1987 |
| EP | 0 259 927 | 3/1988 |
| EP | 0473153 | 3/1992 |
| EP | 0 723 930 | 7/1996 |
| EP | 1 001 002 | 5/2000 |
| EP | 1004746 | 5/2000 |
| EP | 1136542 | 9/2001 |
| EP | 1 207 132 | 5/2002 |
| EP | 1 741 673 | 6/2006 |
| EP | 1768207 | 3/2007 |
| EP | 2058471 | 5/2009 |
| FR | 797 089 | 4/1936 |
| FR | 2 478 615 | 9/1981 |
| FR | 2906879 | 4/2008 |
| GB | 593910 | 10/1947 |
| GB | 640907 | 8/1950 |
| GB | 676615 | 7/1952 |
| GB | 701 131 | 12/1953 |
| GB | 760627 | 11/1956 |
| GB | 798741 | 7/1958 |
| GB | 820 257 | 9/1959 |
| GB | 996327 | 6/1965 |
| GB | 1033764 | 6/1966 |
| GB | 1448562 | 9/1976 |
| GB | 1453081 | 10/1976 |
| GB | 1467219 | 3/1977 |
| GB | 1467995 | 3/1977 |
| GB | 1 599 932 | 7/1977 |
| GB | 1560873 | 2/1980 |
| GB | 2078251 | 1/1982 |
| GB | 2154600 | 9/1985 |
| GB | 2455864 | 6/2009 |
| JP | S28-6633 B | 12/1953 |
| JP | S35-11945 B | 8/1960 |
| JP | S58-27312 B | 3/1976 |
| JP | 53-94305 | 8/1978 |
| JP | 53-111302 | 9/1978 |
| JP | 54020003 | 2/1979 |
| JP | 54-150402 | 11/1979 |
| JP | 55-12181 | 1/1980 |
| JP | S5548287 A | 4/1980 |
| JP | 56-145982 | 11/1981 |
| JP | 56157493 | 12/1981 |
| JP | S586690 A | 1/1983 |
| JP | 60-35092 | 2/1985 |
| JP | 60-77938 | 5/1985 |
| JP | 62241991 | 10/1987 |
| JP | 62 257985 | 11/1987 |
| JP | 03-115491 | 5/1991 |

(56) References Cited

FOREIGN PATENT DOCUMENTS

| | | |
|---|---|---|
| JP | 2000290659 | 10/2000 |
| JP | 2000290670 | 10/2000 |
| JP | 2002105467 | 4/2002 |
| JP | 2004292200 | 10/2004 |
| JP | 2004298818 | 10/2004 |
| JP | 2006 169476 A | 6/2006 |
| WO | 00/18681 | 4/2000 |
| WO | WO 00/43468 | 7/2000 |
| WO | WO 02/40768 | 5/2002 |
| WO | WO 02/079355 | 10/2002 |
| WO | 02/103157 | 12/2002 |
| WO | 03/018958 | 3/2003 |
| WO | WO 03/033624 | 4/2003 |
| WO | 2004/055323 | 7/2004 |
| WO | WO 2004/072210 | 8/2004 |
| WO | WO 2006/031011 | 3/2006 |
| WO | WO 2007/005284 | 1/2007 |
| WO | WO 2007/047210 | 4/2007 |
| WO | 2007/068682 | 6/2007 |
| WO | 2007/077137 | 7/2007 |
| WO | 2007/077138 | 7/2007 |
| WO | 2007/083072 | 7/2007 |
| WO | WO 2007/076363 | 7/2007 |
| WO | WO 2007/128370 | 11/2007 |
| WO | 2007/143376 | 12/2007 |
| WO | WO 2007/143376 | 12/2007 |
| WO | 2008/058636 | 5/2008 |
| WO | WO 2008/073889 | 6/2008 |
| WO | 2008/087154 | 7/2008 |
| WO | 2009/018053 | 2/2009 |
| WO | WO 2009/018053 | 2/2009 |
| WO | WO 2009/048723 | 4/2009 |
| WO | WO 2009/048724 | 4/2009 |
| WO | WO 2009/086361 | 7/2009 |
| WO | WO 2009/086362 | 7/2009 |
| WO | WO 2009/086363 | 7/2009 |
| WO | WO 2009/086366 | 7/2009 |
| WO | WO 2009/086367 | 7/2009 |
| WO | WO 2009/086370 | 7/2009 |
| WO | WO 2009/086372 | 7/2009 |
| WO | WO 2009/086374 | 7/2009 |
| WO | WO 2009/086377 | 7/2009 |
| WO | WO 2009/086383 | 7/2009 |
| WO | WO 2009/086407 | 7/2009 |
| WO | WO 2009/086408 | 7/2009 |
| WO | WO 2009/111330 | 9/2009 |
| WO | WO 2009/111331 | 9/2009 |
| WO | WO 2009/111332 | 9/2009 |
| WO | WO 2009/111335 | 9/2009 |
| WO | WO 2009/111342 | 9/2009 |
| WO | WO 2009/111345 | 9/2009 |
| WO | WO 2009/124017 | 10/2009 |
| WO | WO 2009/124019 | 10/2009 |
| WO | WO 2009/158576 | 12/2009 |
| WO | WO 2009/158579 | 12/2009 |
| WO | WO 2009/158580 | 12/2009 |
| WO | WO 2009/158582 | 12/2009 |
| WO | WO 2009/158583 | 12/2009 |
| WO | WO 2010/033846 | 3/2010 |
| WO | WO 2010/033848 | 3/2010 |
| WO | WO 2010/033850 | 3/2010 |
| WO | WO 2010/033852 | 3/2010 |
| WO | WO 2010/048493 | 4/2010 |
| WO | WO 2010/078297 | 7/2010 |
| WO | WO 2010/078298 | 7/2010 |
| WO | 2010/132549 | 11/2010 |
| WO | WO 2010/132551 | 11/2010 |
| WO | 2011/017630 | 2/2011 |
| WO | 2011/029278 | 3/2011 |
| WO | 2011/029282 | 3/2011 |
| WO | 2011/029283 | 3/2011 |
| WO | 2011/029284 | 3/2011 |
| WO | 2011/029285 | 3/2011 |
| WO | 2011/034888 | 3/2011 |
| WO | 2011/034889 | 3/2011 |
| WO | 2011/034891 | 3/2011 |
| WO | WO 2011/034890 | 3/2011 |
| WO | 2011/049858 | 4/2011 |
| WO | 2011/049861 | 4/2011 |
| WO | 2011/063608 | 6/2011 |
| WO | 2011/084580 | 7/2011 |
| WO | 2011/084581 | 7/2011 |
| WO | 2011/106285 | 9/2011 |
| WO | 2011/139694 | 11/2011 |
| WO | 2011/150217 | 12/2011 |
| WO | WO 2012/024369 | 2/2012 |
| WO | 2012/033997 | 3/2012 |
| WO | 2012/061235 | 5/2012 |
| WO | 2012/061238 | 5/2012 |
| WO | 2012/116003 | 8/2012 |
| WO | 2012/145497 | 10/2012 |
| WO | 2012/166879 | 12/2012 |
| WO | 2013/025808 | 2/2013 |
| WO | 2013/025812 | 2/2013 |
| WO | 2013/052553 | 4/2013 |

OTHER PUBLICATIONS

Asami, K., et al., "Highly Active Iron Catalysts from Ferric Chloride or the Steam Gasification of Brown Coal," ind. Eng. Chem. Res., vol. 32, No. 8, 1993, pp. 1631-1636.

Berger, R., et al., "High Temperature $CO_2$-Absorption: A Process Offering New Prospects in Fuel Chemistry," The Fifth International Symposium on Coal Combustion, Nov. 2003, Nanjing, China, pp. 547-549.

Brown et al., "Biomass-Derived Hydrogen From A Thermally Ballasted Gasifier," Aug. 2005.

Brown et al., "Biomass-Derived Hydrogen From A Thermally Ballasted Gasifier," DOE Hydrogen Program Contractors' Review Metting, Center for Sustainable Environmental Technologies, Iowa State University, May 21, 2003.

Coal Conversion Processes (Gasification), Encyclopedia of Chemical Technology, $4^{th}$ Edition, vol. 6, pp. 541-566.

Cohen, S.J., Project Manager, "Large Pilot Plant Alternatives for Scaleup of the Catalytic Coal Gasification Process," FE-2480-20, U.S. Dept. of Energy, Contract No. EX-76-C-01-2480, 1979.

Euker, Jr., C.A., Reitz, R.A., Program Managers, "Exxon Catalytic Coal-Gasification-Process Development Program," Exxon Research & Engineering Company, FE-2777-31, U.S. Dept. of Energy, Contract No. ET-78-C-01-2777, 1981.

Kalina, T., Nahas, N.C., Project Managers, "Exxon Catalytic Coal Gasification Process Predevelopment Program," Exxon Research & Engineering Company, FE-2369-24, U.S. Dept. of Energy, Contract No., E(49-18)-2369, 1978.

Nahas, N.C., "Exxon Catalytic Coal Gasification Process—Fundamentals to Flowsheets," Fuel, vol. 62, No. 2, 1983, pp. 239-241.

Ohtsuka, Y. et al., "Highly Active Catalysts from Inexpensive Raw Materials for Coal Gasification," Catalysis Today, vol. 39, 1997, pp. 111-125.

Ohtsuka, Yasuo et al, "Steam Gasification of Low-Rank Coals with a Chlorine-Free Iron Catalyst from Ferric Chloride," Ind. Eng. Chem. Res., vol. 30, No. 8, 1991, pp. 1921-1926.

Ohtsuka, Yasuo et al., "Calcium Catalysed Steam Gasification of Yalourn Brown Coal," Fuel, vol. 65, 1986, pp. 1653-1657.

Ohtsuka, Yasuo, et al, "Iron-Catalyzed Gasification of Brown Coal at Low Temperatures," Energy & Fuels, vol. 1, No. 1, 1987, pp. 32-36.

Ohtsuka, Yasuo, et al., "Ion-Exchanged Calcium From Calcium Carbonate and Low-Rank Coals: High Catalytic Activity in Steam Gasification," Energy & Fuels 1996, 10, pp. 431-435.

Ohtsuka, Yasuo et al., "Steam Gasification of Coals with Calcium Hydroxide," Energy & Fuels, vol. 9, No. 6, 1995, pp. 1038-1042.

Pereira, P., et al., "Catalytic Steam Gasification of Coals," Energy & Fuels, vol. 6, No. 4, 1992, pp. 407-410.

Ruan Xiang-Quan, et al., "Effects of Catalysis on Gasification of Tatong Coal Char," Fuel, vol. 66, Apr. 1987, pp. 568-571.

Tandon, D., "Low Temperature and Elevated Pressure Steam Gasification of Illinois Coal," College of Engineering in the Graduate School, Southern Illinois university at Carbondale, Jun. 1996.

(56) References Cited

OTHER PUBLICATIONS

"Integrate Gasification Combined Cycle (IGCC)," WorleyParsons Resources & Energy, http://www.worleyparsons.com/v5/page.aspx?id=164.
Gerdes, Kristin, et al., "Integrated Gasification Fuel Cell Performance and Cost Assessment," National Energy Technology Laboratory, U.S. Department of Energy, Mar. 27, 2009, pp. 1-26.
Ghosh, S., et al., "Energy Analysis of a Cogeneration Plant Using Coal Gasification and Solid Oxide Fuel Cell," Energy, 2006, vol. 31, No. 2-3, pp. 345-363.
Jeon, S.K., et al., "Characteristics of Steam Hydrogasification of Wood Using a Micro-Batch Reactor," Fuel, 2007, vol. 86, pp. 2817-2823.
Li, Mu, et al., "Design of Highly Efficient Coal-Based Integrated Gasification Fuel Cell Power Plants," Journal of Power Sources, 2010, vol. 195, pp. 5707-5718.
Prins, M.J., et al., "Exergetic Optimisation of a Production Process of Fischer-Tropsch Fuels from Biomass," Fuel Processing Technology, 2005, vol. 86, No. 4, pp. 375-389.
U.S. Appl. No. 13/484,918, filed May 31, 2012.
U.S. Appl. No. 13/402,022, filed Feb. 22, 2012.
U.S. Appl. No. 13/450,995, filed Apr. 19, 2012.
U.S. Appl. No. 12/778,538, filed May 12, 2010, Robinson, et al.
U.S. Appl. No. 12/778,548, filed May 12, 2010, Robinson, et al.
U.S. Appl. No. 12/778,552, filed May 12, 2010, Robinson, et al.
Adsorption, http://en.wikipedia.org/wiki/Adsorption, pp. 1-8.
Amine gas treating, http://en.wikipedia.org/wiki/Acid_gas_removal, pp. 1-4.
Coal, http://en.wikipedia.org/wiki/Coal_gasification, pp. 1-8.
Coal Data: A Reference, Energy Information Administration, Office of Coal, Nuclear, Electric, and Alternate Fuels U.S. Department of Energy, DOE/EIA-0064(93), Feb. 1995.
Deepak Tandon, Dissertation Approval, "Low Temperature and Elevated Pressure Steam Gasification of Illinois Coal", Jun. 13, 1996.
Demibras, "Demineralization of Agricultural Residues by Water Leaching", *Energy Sources*, vol. 25, pp. 679-687, (2003).
Fluidized Bed Gasifiers, http://www.energyproducts.com/fluidized_bed_gasifiers.htm, Oct. 2007, pp. 1-5.
Gas separation, http://en.wikipedia.org/wiki/Gas_separation, pp. 1-2.
Gasification, http://en.wikipedia.org/wiki/Gasification, pp. 1-6.
Gallagher Jr., et al., "Catalytic Coal Gasification for SNG Manufacture", *Energy Research*, vol. 4, pp. 137-147, (1980).
Heinemann, et al., "Fundamental and Exploratory Studies of Catalytic Steam Gasification of Carbonaceous Materials", Final Report Fiscal Years 1985-1994.
Jensen, et al. Removal of K and Cl by leaching of straw char, *Biomass and Bioenergy*, vol. 20, pp. 447-457, (2001).
Mengjie, et al., "A potential renewable energy resource development and utilization of biomass energy", http://www.fao.org.docrep/T4470E/t4470e0n.htm, pp. 1-8.

Meyers, et al. Fly Ash as A Construction Material for Highways, A Manual. Federal Highway Administration, Report No. FHWA-IP-76-16, Washington, DC, 1976.
Coal Bottom Ash/Boiler Slag, http://www.p2pays.org/ref/13/12842/cbabs2.htm.
Natural gas processing, http://en.wikipedia.org/wiki/Natural_gas_processing, pp. 1-4.
Natural Gas Processing: The Crucial Link Between Natural Gas Production and Its Transportation to Market. Energy Information Administration, Office of Oil and Gas; pp. 1-11, (2006).
Prins, et al., "Exergetic optimisation of a production process of Fischer-Tropsch fuels from biomass", *Fuel Processing Technology*, vol. 86, pp. 375-389, (2004).
Reboiler, http://en.wikipedia.org/wiki/Reboiler, pp. 1-4.
What is XPS?, http://www.nuance.northwestern.edu/Keckll/xps1.asp, 2006, pp. 1-2.
2.3 Types of gasifiers, http://www.fao.org/docrep/t0512e/T0512e0a.htm, pp. 1-6.
2.4 Gasification fuels, http://www.fao.org/docrep/t0512e/T0512e0b.htm#TopofPage, pp. 1-8.
2.5 Design of downdraught gasifiers, http://www.fao.org/docrep/t0512e/T0512e0c.htm#TopOfPage, pp. 1-8.
2.6 Gas cleaning and cooling, http://www.fao.org/docrep/t0512e0d.htm#TopOFPage, pp. 1-3.
Moulton, Lyle K. "Bottom Ash and Boiler Slag", *Proceedings of the Third International Ash Utilization Symposium*, U.S. Bureau of Mines, Information Circular No. 8640, Washington, DC, 1973.
A.G. Collot et al., "Co-pyrolysis and co-gasification of coal and biomass in bench-scale fixed-bed and fluidized bed reactors", (1999) Fuel 78, pp. 667-679.
Wenkui Zhu et al., "Catalytic gasification of char from co-pyrolysis of coal and biomass", (2008) Fuel Processing Technology, vol. 89, pp. 890-896.
Chiesa P. et al., "Co-Production of hydrogen, electricity and CO2 from coal with commercially ready technology. Part A: Performance and emissions", (2005) International Journal of Hydrogen Energy, vol. 30, No. 7, pp. 747-767.
Brown et al., "Biomass-Derived Hydrogen From a Thermally Ballasted Gasifier", DOE Hydrogen Program Contractors' Review meeting, May 18-21, 2003, Center for Sustainable Environmental Technologies Iowa State University.
Brown et al., "Biomass-Derived Hydrogen From A thermally Ballasted Gasifier", Final Technical Report, Iowa State University, Aug. 2005.
Chiaramonte et al, "Upgrade Coke by Gasification", (1982) Hydrocarbon Processing, vol. 61 (9), pp. 255-257 (Abstract only).
Hydromethanation Process, GreatPoint Energy, Inc., from World Wide Web <http://greatpointenergy.com/ourtechnology.php.> accessed Sep. 5, 2013.
Sigma-Aldrich "Particle Size Conversion Table" (2004); from World Wide Web <http:/www.sigmaaldrich.com/chemistry/learning-center/technical-library/particle-size-conversion.printerview.html>.

\* cited by examiner

HYDROMETHANATION OF A CARBONACEOUS FEEDSTOCK

CROSS-REFERENCE TO RELATED APPLICATION

This application claims priority under 35 U.S.C. §119 from U.S. Provisional Application Ser. No. 61/408,924 (filed 1 Nov. 2010), the disclosure of which is incorporated by reference herein for all purposes as if fully set forth.

This application is related to commonly owned U.S. patent application Ser. No. 13/284,160 (entitled HYDROMETHANATION OF A CARBONACEOUS FEEDSTOCK, concurrently filed herewith), the disclosure of which is incorporated by reference herein for all purposes as if fully set forth.

FIELD OF THE INVENTION

The present invention relates to processes for hydromethanating a carbonaceous feedstock to a methane-enriched synthesis gas, where an oxygen-rich gas stream and the carbonaceous feedstock are fed into a fluidized-bed hydromethanation reactor at a specified zone in order to assist in heat management within the hydromethanation reactor.

BACKGROUND OF THE INVENTION

In view of numerous factors such as higher energy prices and environmental concerns, the production of value-added products (such as pipeline-quality substitute natural gas, hydrogen, methanol, higher hydrocarbons, ammonia and electrical power) from lower-fuel-value carbonaceous feedstocks (such as petroleum coke, resids, asphaltenes, coal and biomass) is receiving renewed attention.

Such lower-fuel-value carbonaceous feedstocks can be gasified at elevated temperatures and pressures to produce a synthesis gas stream that can subsequently be converted to such value-added products.

One advantageous gasification process is hydromethanation, in which the carbonaceous feedstock is converted in a fluidized-bed hydromethanation reactor in the presence of a catalyst source and steam at moderately-elevated temperatures and pressures to directly produce a methane-rich synthesis gas stream (medium BTU synthesis gas stream) raw product. This is distinct from conventional gasification processes, such as those based on partial combustion/oxidation of a carbon source at highly-elevated temperatures and pressures (thermal gasification, typically non-catalytic), where a syngas (carbon monoxide+hydrogen) is the primary product (little or no methane is directly produced), which can then be further processed to produce methane (via catalytic methanation, see reaction (III) below) or any number of other higher hydrocarbon products.

Hydromethanation processes and the conversion/utilization of the resulting methane-rich synthesis gas stream to produce value-added products are disclosed, for example, in U.S. Pat. No. 3,828,474, U.S. Pat. No. 3,958,957, U.S. Pat. No. 3,998,607, U.S. Pat. No. 4,057,512, U.S. Pat. No. 4,092,125, U.S. Pat. No. 4,094,650, U.S. Pat. No. 4,204,843, U.S. Pat. No. 4,243,639, U.S. Pat. No. 4,468,231, U.S. Pat. No. 4,500,323, U.S. Pat. No. 4,541,841, U.S. Pat. No. 4,551,155, U.S. Pat. No. 4,558,027, U.S. Pat. No. 4,606,105, U.S. Pat. No. 4,617,027, U.S. Pat. No. 4,609,456, U.S. Pat. No. 5,017,282, U.S. Pat. No. 5,055,181, U.S. Pat. No. 6,187,465, U.S. Pat. No. 6,790,430, U.S. Pat. No. 6,894,183, U.S. Pat. No. 6,955,695, US2003/0167961A1, US2006/0265953A1, US2007/000177A1, US2007/083072A1, US2007/0277437A1, US2009/0048476A1, US2009/0090056A1, US2009/0090055A1, US2009/0165383A1, US2009/0166588A1, US2009/0165379A1, US2009/0170968A1, US2009/0165380A1, US2009/0165381A1, US2009/0165361A1, US2009/0165382A1, US2009/0169449A1, US2009/0169448A1, US2009/0165376A1, US2009/0165384A1, US2009/0217582A1, US2009/0220406A1, US2009/0217590A1, US2009/0217586A1, US2009/0217588A1, US2009/0218424A1, US2009/0217589A1, US2009/0217575A1, US2009/0229182A1, US2009/0217587A1, US2009/0246120A1, US2009/0259080A1, US2009/0260287A1, US2009/0324458A1, US2009/0324459A1, US2009/0324460A1, US2009/0324461A1, US2009/0324462A1, US2010/0071235A1, US2010/0071262A1, US2010/0120926A1, US2010/0121125A1, US2010/0168494A1, US2010/0168495A1, US2010/0179232A1, US2010/0287835A1, US2011/0031439A1, US2011/0062012A1, US2011/0062722A1, US2011/0062721A1, US2011/0064648A1, US2011/0088896A1, US2011/0088897A1, US2011/0146978A1, US2011/0146979A1, US2011/0207002A1, US2011/0217602A1 and GB1599932. See also Chiaramonte et al, "Upgrade Coke by Gasification", *Hydrocarbon Processing*, September 1982, pp. 255-257; and Kalina et al, "Exxon Catalytic Coal Gasification Process Predevelopment Program, Final Report", Exxon Research and Engineering Co., Baytown, Tex., FE236924, December 1978.

The hydromethanation of a carbon source typically involves four theoretically separate reactions:

$$\text{Steam carbon: } C+H_2O \rightarrow CO+H_2 \tag{I}$$

$$\text{Water-gas shift: } CO+H_2O \rightarrow H_2+CO_2 \tag{II}$$

$$\text{CO Methanation: } CO+3H_2 \rightarrow CH_4+H_2O \tag{III}$$

$$\text{Hydro-gasification: } 2H_2+C \rightarrow CH_4 \tag{IV}$$

In the hydromethanation reaction, the first three reactions (I-III) predominate to result in the following overall reaction:

$$2C+2H_2O \rightarrow CH_4+CO_2 \tag{V}$$

The overall hydromethanation reaction is essentially thermally balanced; however, due to process heat losses and other energy requirements (such as required for evaporation of moisture entering the reactor with the feedstock), some heat must be added to maintain the thermal balance.

The reactions are also essentially syngas (hydrogen and carbon monoxide) balanced (syngas is produced and consumed); therefore, as carbon monoxide and hydrogen are withdrawn with the product gases, carbon monoxide and hydrogen need to be added to the reaction as required to avoid a deficiency.

In order to maintain the net heat of reaction as close to neutral as possible (only slightly exothermic or endothermic), and maintain the syngas balance, a superheated gas stream of steam, carbon monoxide and hydrogen is often fed to the hydromethanation reactor. Frequently, the carbon monoxide and hydrogen streams are recycle streams separated from the product gas, and/or are provided by reforming/partially oxidating a portion of the product methane. See, for example, previously incorporated U.S. Pat. No. 4,094,650, U.S. Pat. No. 6,955,595 and US2007/083072A1.

In one variation of the hydromethanation process, required carbon monoxide, hydrogen and heat energy can also at least in part be generated in situ by feeding oxygen into the hydromethanation reactor. See, for example, previously incorporated US2010/0076235A1, now U.S. Pat. No. 8,328,890, and US2010/0287835A1, now U.S. Pat. No. 8,728,183, as well as commonly-owned U.S. patent application Ser. No. 13/211,476, now U.S. Pat. No. 8,748,687, (entitled HYDROMETHANATION OF A CARBONACEOUS FEEDSTOCK), which was filed 17 Aug. 2011; and commonly-owned US Provisional application Ser. No. 13/228,821 (HYDROMETHANATION OF A CARBONACEOUS FEEDSTOCK), which was filed 9 Sep. 2011.

The result is a "direct" methane-enriched raw product gas stream also containing substantial amounts of hydrogen, carbon monoxide and carbon dioxide which can, for example, be directly utilized as a medium BTU energy source, or can be processed to result in a variety of higher-value product streams such as pipeline-quality substitute natural gas, high-purity hydrogen, methanol, ammonia, higher hydrocarbons, carbon dioxide (for enhanced oil recovery and industrial uses) and electrical energy.

In the variation of the hydromethanation process mentioned above, where oxygen is fed into the reactor to generate required carbon monoxide, hydrogen and heat energy for the hydromethanation reaction, one of the primary concerns is the formation of hot spots, and control and distribution of the heat energy produced as a result of the oxidation reaction. Poor heat management in the hydromethanation reactor can, for example, result in premature (and sometimes catastrophic) equipment failure, as well as agglomeration of carbonaceous materials.

Addressing the issue of heat management in the hydromethanation reactor is, therefore, a critical issue to the proper operation and optimization of the hydromethanation process, and the present invention provides one solution to the heat management issue.

SUMMARY OF THE INVENTION

In one aspect, the invention provides a process for generating a methane-enriched raw product gas stream from a non-gaseous carbonaceous material, the process comprising the steps of:
  (a) supplying to a hydromethanation reactor
    (1) a carbonaceous feedstock derived from the non-gaseous carbonaceous material,
    (2) a hydromethanation catalyst,
    (3) a superheated steam stream and
    (4) an oxygen-rich gas stream,
  wherein the hydromethanation reactor comprises a fluidized bed having a upper portion above a lower portion, and wherein the superheated steam stream and the oxygen-rich gas stream are introduced into the lower portion of the fluidized bed;
  (b) reacting a portion of the carbonaceous feedstock in the hydromethanation reactor in the presence of hydromethanation catalyst, carbon monoxide, hydrogen and steam at a target operating temperature to produce a methane-enriched raw gas and a solid by-product char, wherein the methane-enriched raw gas comprises methane, carbon monoxide, hydrogen, carbon dioxide, hydrogen sulfide, steam, heat energy and entrained fines; and
  (c) reacting a portion of the carbonaceous feedstock with oxygen to produce carbon monoxide, hydrogen and heat energy;
  wherein:
    (i) the reaction of step (b) predominates in the upper portion of the fluidized bed;
    (ii) the reaction of step (c) predominates in the lower portion of the fluidized bed; and
    (iii) the carbonaceous feedstock is supplied to the hydromethanation reactor into the lower portion of the fluidized bed.

The process in accordance with the present invention is useful, for example, for producing higher-value products and by-products from various carbonaceous materials.

These and other embodiments, features and advantages of the present invention will be more readily understood by those of ordinary skill in the art from a reading of the following detailed description.

DETAILED DESCRIPTION

Figure 1:
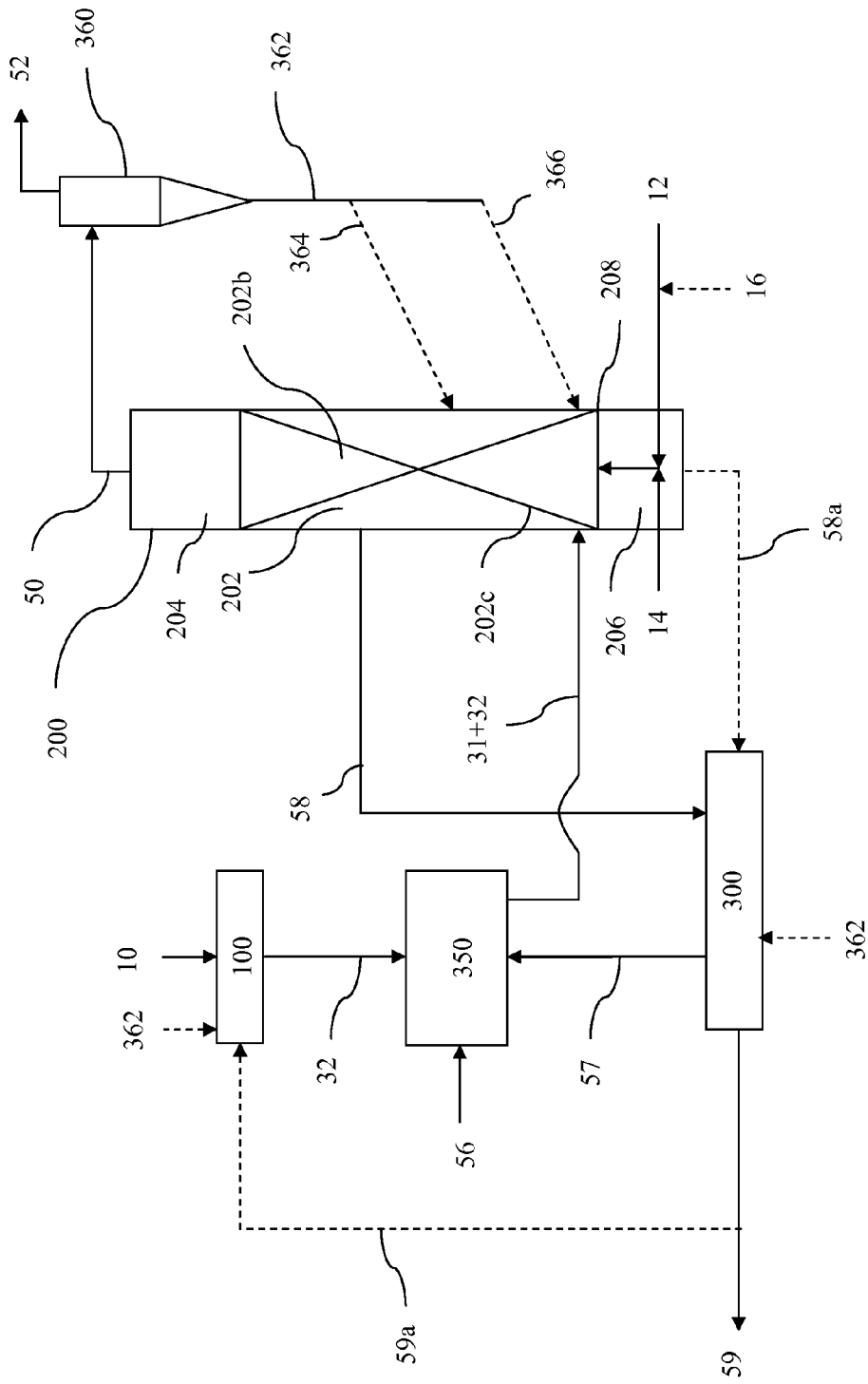
FIG. 1 is a diagram of an embodiment of the process for generating a methane-enriched raw product gas stream in accordance with the present invention.

The present invention relates to processes for converting a non-gaseous carbonaceous material ultimately into one or more value-added gaseous products. Further details are provided below.

In the context of the present description, all publications, patent applications, patents and other references mentioned herein, if not otherwise indicated, are explicitly incorporated by reference herein in their entirety for all purposes as if fully set forth.

Unless otherwise defined, all technical and scientific terms used herein have the same meaning as commonly understood by one of ordinary skill in the art to which this disclosure belongs. In case of conflict, the present specification, including definitions, will control.

Except where expressly noted, trademarks are shown in upper case.

Unless stated otherwise, all percentages, parts, ratios, etc., are by weight.

Unless stated otherwise, pressures expressed in psi units are gauge, and pressures expressed in kPa units are absolute.

When an amount, concentration, or other value or parameter is given as a range, or a list of upper and lower values, this is to be understood as specifically disclosing all ranges formed from any pair of any upper and lower range limits, regardless of whether ranges are separately disclosed. Where a range of numerical values is recited herein, unless otherwise stated, the range is intended to include the endpoints thereof, and all integers and fractions within the range. It is not intended that the scope of the present disclosure be limited to the specific values recited when defining a range.

When the term "about" is used in describing a value or an end-point of a range, the disclosure should be understood to include the specific value or end-point referred to.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but can include other elements not expressly listed or inherent to such process, method, article, or apparatus.

Further, unless expressly stated to the contrary, "or" and "and/or" refers to an inclusive and not to an exclusive. For example, a condition A or B, or A and/or B, is satisfied by any one of the following: A is true (or present) and B is false (or not present), A is false (or not present) and B is true (or present), and both A and B are true (or present).

The use of "a" or "an" to describe the various elements and components herein is merely for convenience and to give a general sense of the disclosure. This description should be read to include one or at least one and the singular also includes the plural unless it is obvious that it is meant otherwise.

The term "substantial", as used herein, unless otherwise defined herein, means that greater than about 90% of the referenced material, preferably greater than about 95% of the referenced material, and more preferably greater than about 97% of the referenced material. If not specified, the percent is on a molar basis when reference is made to a molecule (such as methane, carbon dioxide, carbon monoxide and hydrogen sulfide), and otherwise is on a weight basis (such as for entrained fines).

The term "predominant portion", as used herein, unless otherwise defined herein, means that greater than 50% of the referenced material. If not specified, the percent is on a molar basis when reference is made to a molecule (such as hydrogen, methane, carbon dioxide, carbon monoxide and hydrogen sulfide), and otherwise is on a weight basis (such as for entrained fines).

The term "depleted" is synonymous with reduced from originally present. For example, removing a substantial portion of a material from a stream would produce a material-depleted stream that is substantially depleted of that material. Conversely, the term "enriched" is synonymous with greater than originally present.

The term "carbonaceous" as used herein is synonymous with hydrocarbon.

The term "carbonaceous material" as used herein is a material containing organic hydrocarbon content. Carbonaceous materials can be classified as biomass or non-biomass materials as defined herein.

The term "biomass" as used herein refers to carbonaceous materials derived from recently (for example, within the past 100 years) living organisms, including plant-based biomass and animal-based biomass. For clarification, biomass does not include fossil-based carbonaceous materials, such as coal. For example, see previously incorporated US2009/0217575A1, US2009/0229182A1 and US2009/0217587A1.

The term "plant-based biomass" as used herein means materials derived from green plants, crops, algae, and trees, such as, but not limited to, sweet sorghum, bagasse, sugarcane, bamboo, hybrid poplar, hybrid willow, albizia trees, eucalyptus, alfalfa, clover, oil palm, switchgrass, sudangrass, millet, jatropha, and *miscanthus* (e.g., *Miscanthus×giganteus*). Biomass further include wastes from agricultural cultivation, processing, and/or degradation such as corn cobs and husks, corn stover, straw, nut shells, vegetable oils, canola oil, rapeseed oil, biodiesels, tree bark, wood chips, sawdust, and yard wastes.

The term "animal-based biomass" as used herein means wastes generated from animal cultivation and/or utilization. For example, biomass includes, but is not limited to, wastes from livestock cultivation and processing such as animal manure, guano, poultry litter, animal fats, and municipal solid wastes (e.g., sewage).

The term "non-biomass", as used herein, means those carbonaceous materials which are not encompassed by the term "biomass" as defined herein. For example, non-biomass include, but are not limited to, anthracite, bituminous coal, sub-bituminous coal, lignite, petroleum coke, asphaltenes, liquid petroleum residues or mixtures thereof. For example, see US2009/0166588A1, US2009/0165379A1, US2009/0165380A1, US2009/0165361A1, US2009/0217590A1 and US2009/0217586A1.

"Liquid heavy hydrocarbon materials" are viscous liquid or semi-solid materials that are flowable at ambient conditions or can be made flowable at elevated temperature conditions. These materials are typically the residue from the processing of hydrocarbon materials such as crude oil. For example, the first step in the refining of crude oil is normally a distillation to separate the complex mixture of hydrocarbons into fractions of differing volatility. A typical first-step distillation requires heating at atmospheric pressure to vaporize as much of the hydrocarbon content as possible without exceeding an actual temperature of about 650° F., since higher temperatures may lead to thermal decomposition. The fraction which is not distilled at atmospheric pressure is commonly referred to as "atmospheric petroleum residue". The fraction may be further distilled under vacuum, such that an actual temperature of up to about 650° F. can vaporize even more material. The remaining undistillable liquid is referred to as "vacuum petroleum residue". Both atmospheric petroleum residue and vacuum petroleum residue are considered liquid heavy hydrocarbon materials for the purposes of the present invention.

Non-limiting examples of liquid heavy hydrocarbon materials include vacuum resids; atmospheric resids; heavy and reduced petroleum crude oils; pitch, asphalt and bitumen (naturally occurring as well as resulting from petroleum refining processes); tar sand oil; shale oil; bottoms from catalytic cracking processes; coal liquefaction bottoms; and other hydrocarbon feedstreams containing significant amounts of heavy or viscous materials such as petroleum wax fractions.

The term "asphaltene" as used herein is an aromatic carbonaceous solid at room temperature, and can be derived, for example, from the processing of crude oil and crude oil tar sands. Asphaltenes may also be considered liquid heavy hydrocarbon feedstocks.

The liquid heavy hydrocarbon materials may inherently contain minor amounts of solid carbonaceous materials, such as petroleum coke and/or solid asphaltenes, that are generally dispersed within the liquid heavy hydrocarbon matrix, and that remain solid at the elevated temperature conditions utilized as the feed conditions for the present process.

The terms "petroleum coke" and "petcoke" as used herein include both (i) the solid thermal decomposition product of high-boiling hydrocarbon fractions obtained in petroleum processing (heavy residues—"resid petcoke"); and (ii) the solid thermal decomposition product of processing tar sands (bituminous sands or oil sands—"tar sands petcoke"). Such carbonization products include, for example, green, calcined, needle and fluidized bed petcoke.

Resid petcoke can also be derived from a crude oil, for example, by coking processes used for upgrading heavy-gravity residual crude oil (such as a liquid petroleum residue), which petcoke contains ash as a minor component, typically about 1.0 wt % or less, and more typically about 0.5 wt % of less, based on the weight of the coke. Typically, the ash in such lower-ash cokes predominantly comprises metals such as nickel and vanadium.

Tar sands petcoke can be derived from an oil sand, for example, by coking processes used for upgrading oil sand. Tar sands petcoke contains ash as a minor component, typically in the range of about 2 wt % to about 12 wt %, and more typically in the range of about 4 wt % to about 12 wt %, based on the overall weight of the tar sands petcoke. Typically, the ash in such higher-ash cokes predominantly comprises materials such as silica and/or alumina.

Petroleum coke can comprise at least about 70 wt % carbon, at least about 80 wt % carbon, or at least about 90 wt % carbon, based on the total weight of the petroleum coke.

Typically, the petroleum coke comprises less than about 20 wt % inorganic compounds, based on the weight of the petroleum coke.

The term "coal" as used herein means peat, lignite, sub-bituminous coal, bituminous coal, anthracite, or mixtures thereof. In certain embodiments, the coal has a carbon content of less than about 85%, or less than about 80%, or less than about 75%, or less than about 70%, or less than about 65%, or less than about 60%, or less than about 55%, or less than about 50% by weight, based on the total coal weight. In other embodiments, the coal has a carbon content ranging up to about 85%, or up to about 80%, or up to about 75% by weight, based on the total coal weight. Examples of useful coal include, but are not limited to, Illinois #6, Pittsburgh #8, Beulah (ND), Utah Blind Canyon, and Powder River Basin (PRB) coals. Anthracite, bituminous coal, sub-bituminous coal, and lignite coal may contain about 10 wt %, from about 5 to about 7 wt %, from about 4 to about 8 wt %, and from about 9 to about 11 wt %, ash by total weight of the coal on a dry basis, respectively. However, the ash content of any particular coal source will depend on the rank and source of the coal, as is familiar to those skilled in the art. See, for example, "Coal Data: A Reference", Energy Information Administration, Office of Coal, Nuclear, Electric and Alternate Fuels, U.S. Department of Energy, DOE/EIA-0064(93), February 1995.

The ash produced from combustion of a coal typically comprises both a fly ash and a bottom ash, as is familiar to those skilled in the art. The fly ash from a bituminous coal can comprise from about 20 to about 60 wt % silica and from about 5 to about 35 wt % alumina, based on the total weight of the fly ash. The fly ash from a sub-bituminous coal can comprise from about 40 to about 60 wt % silica and from about 20 to about 30 wt % alumina, based on the total weight of the fly ash. The fly ash from a lignite coal can comprise from about 15 to about 45 wt % silica and from about 20 to about 25 wt % alumina, based on the total weight of the fly ash. See, for example, Meyers, et al. "Fly Ash. A Highway Construction Material," Federal Highway Administration, Report No. FHWA-IP-76-16, Washington, D.C., 1976.

The bottom ash from a bituminous coal can comprise from about 40 to about 60 wt % silica and from about 20 to about 30 wt % alumina, based on the total weight of the bottom ash. The bottom ash from a sub-bituminous coal can comprise from about 40 to about 50 wt % silica and from about 15 to about 25 wt % alumina, based on the total weight of the bottom ash. The bottom ash from a lignite coal can comprise from about 30 to about 80 wt % silica and from about 10 to about 20 wt % alumina, based on the total weight of the bottom ash. See, for example, Moulton, Lyle K. "Bottom Ash and Boiler Slag," Proceedings of the Third International Ash Utilization Symposium, U.S. Bureau of Mines, Information Circular No. 8640, Washington, D.C., 1973.

A material such as methane can be biomass or non-biomass under the above definitions depending on its source of origin.

A "non-gaseous" material is substantially a liquid, semi-solid, solid or mixture at ambient conditions. For example, coal, petcoke, asphaltene and liquid petroleum residue are non-gaseous materials, while methane and natural gas are gaseous materials.

The term "unit" refers to a unit operation. When more than one "unit" is described as being present, those units are operated in a parallel fashion unless otherwise stated. A single "unit", however, may comprise more than one of the units in series, or in parallel, depending on the context. For example, an acid gas removal unit may comprise a hydrogen sulfide removal unit followed in series by a carbon dioxide removal unit. As another example, a contaminant removal unit may comprise a first removal unit for a first contaminant followed in series by a second removal unit for a second contaminant. As yet another example, a compressor may comprise a first compressor to compress a stream to a first pressure, followed in series by a second compressor to further compress the stream to a second (higher) pressure.

The term "a portion of the carbonaceous feedstock" refers to carbon content of unreacted feedstock as well as partially reacted feedstock, as well as other components that may be derived in whole or part from the carbonaceous feedstock (such as carbon monoxide, hydrogen and methane). For example, "a portion of the carbonaceous feedstock" includes carbon content that may be present in by-product char and recycled fines, which char is ultimately derived from the original carbonaceous feedstock.

The term "superheated steam" in the context of the present invention refers to a steam stream that is non-condensing under the conditions utilized.

The term "syngas demand" refers to the maintenance of syngas balance in the hydromethanation reactor for the reaction of step (b). As indicated above, in the overall desirable steady-state hydromethanation reaction (see equations (I), (II) and (III) above), hydrogen and carbon monoxide are generated and consumed in relative balance. Because both hydrogen and carbon monoxide are withdrawn as part of the gaseous products, hydrogen and carbon monoxide must be added to and/or generated in situ in (via a combustion/oxidation reaction with supplied oxygen as discussed below) the hydromethanation reactor in an amount at least required to substantially maintain this reaction balance. For the purposes of the present invention, the amount of hydrogen and carbon monoxide that must be added to and/or generated in situ for the hydromethanation reaction (step (b)) is the "syngas demand".

The term "steam demand" refers to the amount of steam that must be added to the hydromethanation reactor. Steam is consumed in the hydromethanation reaction and some steam must be added to the hydromethanation reactor. The theoretical consumption of steam is two moles for every two moles of carbon in the feed to produce one mole of methane and one mole of carbon dioxide (see equation (V)). In actual practice, the steam consumption is not perfectly efficient and steam is withdrawn with the product gases; therefore, a greater than theoretical amount of steam needs to be added to the hydromethanation reactor, which added amount is the "steam demand". Steam can be added, for example, via the superheated steam stream and the oxygen-rich gas stream. The amount of steam to be added (and the source) is discussed in further detail below. Steam generated in situ from the carbonaceous feedstock (e.g., from vaporization of any moisture content of the carbonaceous feedstock, or from an oxidation reaction with hydrogen, methane and/or other hydrocarbons present in or generated from the carbonaceous feedstock) can assist in satisfying the steam demand; however, it should be noted that any steam generated in situ or fed into the hydromethanation reactor at a temperature lower than the hydromethanation reaction temperature will have an impact on the "heat demand" for the hydromethanation reaction.

The term "heat demand" refers to the amount of heat energy that must be added to the hydromethanation reactor and generated in situ (for example, via the reaction of step (c)) to keep the reaction of step (b) in substantial thermal balance, as discussed above and as further detailed below.

Although methods and materials similar or equivalent to those described herein can be used in the practice or testing of the present disclosure, suitable methods and materials are described herein. The materials, methods, and examples herein are thus illustrative only and, except as specifically stated, are not intended to be limiting.

General Process Information

In one embodiment of the invention, a methane-enriched raw product gas stream (50) is ultimately generated from a non-gaseous carbonaceous material (10) as illustrated in FIG. 1.

In accordance with an embodiment of the invention, the non-gaseous carbonaceous material (10) is processed in a feedstock preparation unit (100) to generate a carbonaceous feedstock (32) which is fed to a catalyst application unit (350) where hydromethanation catalyst is applied to generate a catalyzed carbonaceous feedstock (31+32). The hydromethanation catalyst will typically comprise a recycle catalyst from recycle catalyst stream (57) and a makeup catalyst from make-up catalyst stream (56). Further details are provided below.

The catalyzed carbonaceous feedstock (31+32) is fed into a hydromethanation reactor (200) along with a superheated steam stream (12), an oxygen-rich gas stream (14) and, optionally, a superheated syngas feed stream (16). The superheated steam stream (12) and optional superheated syngas feed stream (16) may be a single feed stream which comprises, or multiple feed streams which, in combination with the oxygen-rich gas stream (14) and in situ generation of heat energy, syngas and steam comprise, steam and heat energy, and optionally hydrogen and carbon monoxide, as required to at least substantially satisfy, or at least satisfy, the syngas, steam and heat demands of the hydromethanation reaction that takes place in hydromethanation reactor (200).

In one embodiment, as disclosed in commonly owned U.S. patent application Ser. No. 13/211,476 (entitled HYDROMETHANATION OF A CARBONACEOUS FEEDSTOCK, filed 17 Aug. 2011), the optional superheated syngas feed stream (16) is not present, and the catalyzed carbonaceous feedstock (31+32), superheated steam stream (12) and oxygen-rich gas stream (14) are all fed to hydromethanation reactor (200) at a temperature below the target operating temperature of the hydromethanation reaction.

The hydromethanation reactor (200) comprises a fluidized bed (202) with an upper portion (202b), and a lower portion (202c), in which the reactions of step (b) and step (c) take place. Without being bound by any particular theory, the reaction of step (b) (hydromethanation reaction) predominates in upper portion (202b), and the reaction of step (c) (oxidation reaction) predominates in lower portion (202c). It is believed that there is no specific defined boundary between the two portions, but rather there is a transition as oxygen is consumed (and heat energy and syngas are generated) in lower portion (202c). It is also believed that oxygen consumption is rapid under the conditions present in hydromethanation reactor (200); therefore, the predominant portion of fluidized bed (202) will be upper portion (202b).

The superheated steam stream (12) and oxygen-rich gas stream (14) may be fed separately into the hydromethanation reactor (200), but are typically combined prior to feeding into lower portion (202c) of fluidized bed (202). In one embodiment, the temperature of both streams (individually and combined) upon introduction to lower portion (202c) of fluidized bed (202) will be lower than the target operating temperature of the reaction of step (b).

In accordance with the present invention, carbonaceous feedstock (32) (or catalyzed carbonaceous feedstock (31+32)) is also fed into lower portion (202c) of fluidized bed (202). Further details are provided below.

At least a portion of the carbonaceous feedstock in lower portion (202c) of fluidized bed (202) will react with oxygen from oxygen-rich gas stream (14) to generate heat energy, and also hydrogen and carbon monoxide (syngas), desirably in sufficient amounts to satisfy the heat and syngas demands of the hydromethanation reaction of step (b) (desirably no separate superheated syngas feed stream (16) is utilized in steady-state operation of the process). This includes the reaction of solid carbon from unreacted (fresh) feedstock, partially reacted feedstock (such as char and recycled fines), as well gases (carbon monoxide, hydrogen, methane and higher hydrocarbons) that may be generated from or carried with the feedstock and recycle fines in lower portion (202c). Generally some water (steam) may be produced, as well as other by-products such as carbon dioxide depending on the extent of combustion/oxidation.

In hydromethanation reactor (200) (predominantly in upper portion (202b) of fluidized bed (202)), the carbonaceous feedstock, steam, hydrogen and carbon monoxide react in the presence of the hydromethanation catalyst to generate a methane-enriched raw product, which is ultimately withdrawn as a methane-enriched raw product stream (50) from the hydromethanation reactor (200).

The reactions of the carbonaceous feedstock in fluidized bed (202) also results in a by-product char comprising unreacted carbon as well as non-carbon content from the carbonaceous feedstock (including hydromethanation catalyst) as described in further detail below. To prevent buildup of the residue in the hydromethanation reactor (200), a solid purge of by-product char is routinely withdrawn (periodically or continuously) via char withdrawal line (58). Because catalyzed carbonaceous feedstock (31+32) is introduced into lower portion (202c) of fluidized bed (202), char withdrawal line (58) will be located at a point such that by-product char is withdrawn from fluidized bed (202) at one or more points above the feed location of catalyzed carbonaceous feedstock (31+32), typically from upper portion (202b) of fluidized bed (202).

In addition, due to the lower feed point of catalyzed carbonaceous feedstock (31+32) into hydromethanation reactor (200), and higher withdrawal point of by-product char from hydromethanation reactor (200), hydromethanation reactor (200) with be a flow-up configuration as discussed below.

Hydromethanation reactor (200) also typically comprises a zone (206) below fluidized-bed (202), with the two sections typically being separated by a grid plate (208) or similar divider. Particles too large to be fluidized in fluidized-bed section (202), for example large-particle by-product char and non-fluidizable agglomerates, are generally collected in lower portion (202c) of fluidized bed (202), as well as zone (206). Such particles will typically comprise a carbon content (as well as an ash and catalyst content), and may be removed periodically from hydromethanation reactor (200) via char withdrawal line (58a) for catalyst recovery as discussed below.

Typically, the methane-enriched raw product passes through an initial disengagement zone (204) above the fluidized-bed section (202) prior to withdrawal from hydromethanation reactor (200). The disengagement zone (204) may optionally contain, for example, one or more internal cyclones and/or other entrained particle disengagement mechanisms. The "withdrawn" (see discussion below) methane-enriched raw product gas stream (50) typically comprises at least methane, carbon monoxide, carbon dioxide, hydrogen, hydrogen sulfide, steam, heat energy and entrained fines.

The methane-enriched raw product gas stream (50) is initially treated to remove a substantial portion of the entrained fines, typically via a cyclone assembly (360) (for example, one or more internal and/or external cyclones), which may be followed if necessary by optional additional treatments such as Venturi scrubbers, as discussed in more detail below. The "withdrawn" methane-enriched raw product gas stream (50), therefore, is to be considered the raw product prior to fines separation, regardless of whether the fines separation takes place internal to and/or external of hydromethanation reactor (200).

As specifically depicted in FIG. 1, the methane-enriched raw product stream (50) is passed from hydromethanation reactor (200) to a cyclone assembly (360) for entrained particle separation. While cyclone assembly (360) is shown in FIG. 1 as a single external cyclone for simplicity, as indicated above cyclone assembly (360) may be an internal and/or external cyclone, and may also be a series of multiple internal and/or external cyclones.

The methane-enriched raw product gas stream (50) is treated in cyclone assembly (360) to generate the fines-depleted methane-enriched raw product gas stream (52) and a recovered fines stream (362).

Recovered fines stream (362) may be fed back into hydromethanation reactor (202), for example, into upper portion (202b) of fluidized bed (202) via fines recycle line (364), and/or into lower portion (202c) of fluidized bed (202) via fines recycle line (366) (as disclosed in commonly owned US Provisional application Ser. No. 13/228,821 (entitled HYDROMETHANATION OF A CARBONACEOUS FEEDSTOCK, filed 9 Sep. 2011)). To the extent not fed back into fluidized bed (202), recovered fines stream (362) may, for example, be recycled back to feedstock preparation unit (100) and/or catalyst recovery unit (300).

The fines-depleted methane-enriched raw product gas stream (52) typically comprises at least methane, carbon monoxide, carbon dioxide, hydrogen, hydrogen sulfide, steam, ammonia and heat energy, as well as small amounts of contaminants such as remaining residual entrained fines, and other volatilized and/or carried material (for example, mercury) that may be present in the carbonaceous feedstock. There are typically virtually no (total typically less than about 50 ppm) condensable (at ambient conditions) hydrocarbons present in fines-depleted methane-enriched raw product gas stream (52).

The fines-depleted methane-enriched raw product gas stream (52) may be treated in one or more downstream processing steps to recover heat energy, decontaminate and convert, to produce one or more value-added products such as, for example, substitute natural gas (pipeline quality), hydrogen, carbon monoxide, syngas, ammonia, methanol, other syngas-derived products and electrical power, as disclosed in many of the documents referenced in the "Hydromethanation" section below, and as discussed in further detail below.

Additional details and embodiments are provided below.

Hydromethanation

Catalytic gasification/hydromethanation and/or raw product conversion processes and conditions are generally disclosed, for example, in U.S. Pat. No. 3,828,474, U.S. Pat. No. 3,998,607, U.S. Pat. No. 4,057,512, U.S. Pat. No. 4,092,125, U.S. Pat. No. 4,094,650, U.S. Pat. No. 4,204,843, U.S. Pat. No. 4,468,231, U.S. Pat. No. 4,500,323, U.S. Pat. No. 4,541,841, U.S. Pat. No. 4,551,155, U.S. Pat. No. 4,558,027, U.S. Pat. No. 4,606,105, U.S. Pat. No. 4,617,027, U.S. Pat. No. 4,609,456, U.S. Pat. No. 5,017,282, U.S. Pat. No. 5,055,181, U.S. Pat. No. 6,187,465, U.S. Pat. No. 6,790,430, U.S. Pat. No. 6,894,183, U.S. Pat. No. 6,955,695, US2003/0167961A1 and US2006/0265953A1, as well as in commonly owned US2007/0000177A1, US2007/0083072A1, US2007/0277437A1, US2009/0048476A1, US2009/0090056A1, US2009/0090055A1, US2009/0165383A1, US2009/0166588A1, US2009/0165379A1, US2009/0170968A1, US2009/0165380A1, US2009/0165381A1, US2009/0165361A1, US2009/0165382A1, US2009/0169449A1, US2009/0169448A1, US2009/0165376A1, US2009/0165384A1, US2009/0217582A1, US2009/0220406A1, US2009/0217590A1, US2009/0217586A1, US2009/0217588A1, US2009/0218424A1, US2009/0217589A1, US2009/0217575A1, US2009/0229182A1, US2009/0217587A1, US2009/0246120A1, US2009/0259080A1, US2009/0260287A1, US2009/0324458A1, US2009/0324459A1, US2009/0324460A1, US2009/0324461A1, US2009/0324462A1, US2010/0076235A1, US2010/0071262A1, US2010/0121125A1, US2010/0120926A1, US2010/0179232A1, US2010/0168494A1, US2010/0168495A1, US2010/0292350A1, US2010/0287836A1, US2010/0287835A1, US2011/0031439A1, US2011/0062012A1, US2011/0062722A1, US2011/0062721A1, US2011/0064648A1, US2011/0088896A1, US2011/0088897A1, US2011/0146978A1, US2011/0146979A1, US2011/0207002A1 and US2011/0217602A1, as well as U.S. patent application Ser. No. 13/094,438 (entitled HYDROMETHANATION OF A CARBONACEOUS FEEDSTOCK WITH VANADIUM RECOVERY), which was filed 26 Apr. 2011; U.S. patent application Ser. No. 13/211,476 (entitled HYDROMETHANATION OF A CARBONACEOUS FEEDSTOCK, filed 17 Aug. 2011); and U.S. patent application Ser. No. 13/228,821 (entitled HYDROMETHANATION OF A CARBONACEOUS FEEDSTOCK, filed 9 Sep. 2011).

In an embodiment in accordance with the present invention as illustrated in FIG. 1, catalyzed carbonaceous feedstock (31+32), superheated steam stream (12) and, optionally, superheated syngas feed stream (16) are introduced into hydromethanation reactor (200). In addition, an amount of an oxygen-rich gas stream (14) is also be introduced into hydromethanation reactor for in situ generation of heat energy and syngas, as generally discussed above and disclosed in many of the previously incorporated references (see, for example, previously incorporated US2010/0076235A1, US2010/0287835A1, US2011/0062721A1 and U.S. patent application Ser. No. 13/211,476).

Superheated steam stream (12), oxygen-rich gas stream (14) and superheated syngas feed stream (16) (if present) are desirably introduced into hydromethanation reactor at a temperature below the target operating temperature of the hydromethanation reaction. Although under those conditions this would have a negative impact on the heat demand of the hydromethanation reaction (prior to the reaction of step (c)), this actually allows full steam/heat integration of the process, without the use of fuel fired superheaters (in steady-state operation of the process) that are typically fueled with a portion of the product from the process. Typically, superheated syngas feed stream (16) will not be present.

Steps (b) and (c) occur within hydromethanation reactor (200).

Hydromethanation reactor (200) is a fluidized-bed reactor. As mentioned above, hydromethanation reactor (200) has a "flow up" co-current configuration, where the catalyzed carbonaceous feedstock (31+32) is fed at a lower point (bottom portion (202c) of fluidized bed (202)) so that the particles flow up the fluidized bed (202), along with the gases, to a char by-product removal zone, for example, near or at the top of upper portion (202b) of fluidized bed (202), to the top of fluidized bed (202). In one embodiment, the feed point of the carbonaceous feedstock (such as catalyzed carbonaceous feedstock (31+32)) should result in introduction into fluidized bed (200) as close to the point of introduction of oxygen (from oxygen-rich gas stream (14)) as reasonably possible.

Hydromethanation reactor (200) is typically operated at moderately high pressures and temperatures, requiring introduction of solid streams (e.g., catalyzed carbonaceous feedstock (31+32) and if present recycle fines) to the reaction chamber of the reactor while maintaining the required temperature, pressure and flow rate of the streams. Those skilled in the art are familiar with feed inlets to supply solids into the reaction chambers having high pressure and/or temperature environments, including star feeders, screw feeders, rotary pistons and lock-hoppers. It should be understood that the feed inlets can include two or more pressure-balanced elements, such as lock hoppers, which would be used alternately. In some instances, the carbonaceous feedstock can be prepared at pressure conditions above the operating pressure of the reactor and, hence, the particulate composition can be directly passed into the reactor without further pressurization. Gas for pressurization can be an inert gas such as nitrogen, or more typically a stream of carbon dioxide that can, for example be recycled from a carbon dioxide stream generated by an acid gas removal unit.

Hydromethanation reactor (200) is desirably operated at a moderate temperature (as compared to conventional gasification processes), with a target operating temperature of at least about 1000° F. (about 538° C.), or at least about 1100° F. (about 593° C.), to about 1500° F. (about 816° C.), or to about 1400° F. (about 760° C.), or to about 1300° F. (704° C.); and a pressure of about 250 psig (about 1825 kPa, absolute), or about 400 psig (about 2860 kPa), or about 450 psig (about 3204 kPa), to about 800 psig (about 5617 kPa), or to about 700 psig (about 4928 kPa), or to about 600 psig (about 4238 kPa), or to about 500 psig (about 3549 kPa).

Typical gas flow velocities in hydromethanation reactor (200) are from about 0.5 ft/sec (about 0.15 m/sec), or from about 1 ft/sec (about 0.3 m/sec), to about 2.0 ft/sec (about 0.6 m/sec), or to about 1.5 ft/sec (about 0.45 m/sec).

As oxygen-rich gas stream (14) is fed into hydromethanation reactor (200), a portion of the carbonaceous feedstock (desirably carbon from the partially reacted feedstock, by-product char and recycled fines) will be consumed in an oxidation/combustion reaction, generating heat energy as well as typically some amounts carbon monoxide and hydrogen (and typically other gases such as carbon dioxide and steam). The variation of the amount of oxygen supplied to hydromethanation reactor (200) provides an advantageous process control to ultimately maintain syngas and heat balance. Increasing the amount of oxygen will increase the oxidation/combustion, and therefore increase in situ heat generation. Decreasing the amount of oxygen will conversely decrease the in situ heat generation. The amount of syngas generated will ultimately depend on the amount of oxygen utilized, and higher amounts of oxygen may result in a more complete combustion/oxidation to carbon dioxide and water, as opposed to a more partial combustion to carbon monoxide and hydrogen.

The amount of oxygen supplied to hydromethanation reactor (200) must be sufficient to combust/oxidize enough of the carbonaceous feedstock to generate enough heat energy and syngas to meet the heat and syngas demands of the steady-state hydromethanation reaction.

In one embodiment, the amount of molecular oxygen (as contained in the oxygen-rich gas stream (14)) that is provided to the hydromethanation reactor (200) can range from about 0.10, or from about 0.20, or from about 0.25, to about 0.6, or to about 0.5, or to about 0.4, or to about 0.35 pounds of $O_2$ per pound of carbonaceous feedstock.

The hydromethanation and oxidation/combustion reactions will occur contemporaneously. Depending on the configuration of hydromethanation reactor (200), the two steps predominant in separate zones—the hydromethanation in upper portion (202b) of fluidized bed (202), and the oxidation/combustion in lower portion (202c) of fluidized bed (202). The oxygen-rich gas stream (14) is typically mixed with superheated steam stream (12) and the mixture introduced at or near the bottom of fluidized bed (202) in lower portion (202c) to avoid formation of hot spots in reactor (200), and to avoid (minimize) combustion of the desired gaseous products. In accordance with the present invention, feeding the catalyzed carbonaceous feedstock (31+32) into lower portion (202c) of fluidized bed (202) also assists in heat dissipation and the avoidance if formation of hot spots in reactor (200). If superheated syngas feed stream (16) is present, that stream will typically be introduced as a mixture with steam stream (12), with oxygen-rich gas stream (14) introduced separately into lower portion (202c) of fluidized bed (202) so as to not preferentially consume the syngas components.

The oxygen-rich gas stream (14) can be fed into hydromethanation reactor (200) by any suitable means such as direct injection of purified oxygen, oxygen-air mixtures, oxygen-steam mixtures, or oxygen-inert gas mixtures into the reactor. See, for instance, U.S. Pat. No. 4,315,753 and Chiaramonte et al., Hydrocarbon Processing, September 1982, pp. 255-257.

The oxygen-rich gas stream (14) is typically generated via standard air-separation technologies, and will be fed mixed with steam, and introduced at a temperature above about 250° F. (about 121° C.), to about 400° F. (about 204° C.), or to about 350° F. (about 177° C.), or to about 300° F. (about 149° C.), and at a pressure at least slightly higher than present in hydromethanation reactor (200). The steam in oxygen-rich gas stream (14) should be non-condensable during transport of oxygen-rich stream (14) to hydromethanation reactor (200), so oxygen-rich stream (14) may need to be transported at a lower pressure then pressurized (compressed) just prior to introduction into hydromethanation reactor (200).

As indicated above, the hydromethanation reaction has a steam demand, a heat demand and a syngas demand. These conditions in combination are important factors in determining the operating conditions for the hydromethanation reaction as well as the remainder of the process.

For example, the steam demand of the hydromethanation reaction requires a molar ratio of steam to carbon (in the feedstock) of at least about 1. Typically, however, the molar ratio is greater than about 1, or from about 1.5 (or greater), to about 6 (or less), or to about 5 (or less), or to about 4 (or less), or to about 3 (or less), or to about 2 (or less). The moisture content of the catalyzed carbonaceous feedstock (31+32), moisture generated from the carbonaceous feedstock in the hydromethanation reactor (200), and steam included in the superheated steam stream (12), oxygen-rich gas stream (14) and recycle fines stream(s) (and optional superheated syngas feed stream (16)), should be sufficient to at least substantially satisfy (or at least satisfy) the steam demand of the hydromethanation reaction.

As also indicated above, the hydromethanation reaction (step (b)) is essentially thermally balanced but, due to process heat losses and other energy requirements (for example, vaporization of moisture on the feedstock), some heat must be generated in the hydromethanation reaction to maintain the thermal balance (the heat demand). The partial combustion/oxidation of carbon in the presence of the oxygen introduced into hydromethanation reactor (200) from oxygen-rich gas stream (14) should be sufficient to at least substantially satisfy (or at least satisfy) both the heat and syngas demand of the hydromethanation reaction.

The gas utilized in hydromethanation reactor (200) for pressurization and reaction of the catalyzed carbonaceous feedstock (31+32) comprises the superheated steam stream (12) and oxygen-rich gas stream (14) (and optional superheated syngas feed stream (16)) and, optionally, additional nitrogen, air, or inert gases such as argon, which can be supplied to hydromethanation reactor (200) according to methods known to those skilled in the art. As a consequence, the superheated steam stream (12) and oxygen-rich gas stream (14) must be provided at a higher pressure which allows them to enter hydromethanation reactor (200).

Desirably, all streams should be fed into hydromethanation reactor (200) at a temperature less than the target operating temperature of the hydromethanation reactor, such as disclosed in previously incorporated US Provisional application Ser. No. 13/211,476.

Superheated steam stream (12) can be at a temperature as low as the saturation point at the feed pressure, but it is desirable to feed at a temperature above this to avoid the possibility of any condensation occurring. Typical feed temperatures of superheated steam stream (12) are from about 500° F. (about 260° C.), or from about 600° F. (about 316° C.), or from about 700° F. (about 371° C.), to about 950° F. (about 510° C.), or to about 900° F. (about 482° C.). The temperature of superheated steam stream (12) will ultimately depend on the level of heat recovery from the process, as discussed below. In any event, no fuel fired superheater should be used in the superheating of steam stream (12) in steady-state operation of the process.

When superheated steam stream (12) and oxygen-rich stream (14) are combined for feeding into lower portion (202c) of fluidized bed (202), the temperature of the combined stream will typically range from about from about 500° F. (about 260° C.), or from about 600° F. (about 316° C.), or from about 700° F. (about 371° C.), to about 900° F. (about 482° C.), or to about 850° F. (about 454° C.).

The temperature in hydromethanation reactor (200) can be controlled, for example, by controlling the amount and temperature of the superheated steam stream (12), as well as the amount of oxygen supplied to hydromethanation reactor (200).

Advantageously, steam for the hydromethanation reaction is generated from other process operations through process heat capture (such as generated in a waste heat boiler, generally referred to as "process steam" or "process-generated steam") and, in some embodiments, is solely supplied as process-generated steam. For example, process steam streams generated by a heat exchanger unit or waste heat boiler can be fed to hydromethanation reactor (200) as part of superheated steam stream (12), such as disclosed, for example, in previously incorporated US2010/0287835A1 and U.S. patent application Ser. No. 13/211,476, and as discussed below.

In certain embodiments, the overall process described herein is at least substantially steam neutral, such that steam demand (pressure and amount) for the hydromethanation reaction can be satisfied via heat exchange with process heat at the different stages therein, or steam positive, such that excess steam is produced and can be used, for example, for power generation. Desirably, process-generated steam accounts for greater than about 95 wt %, or greater than about 97 wt %, or greater than about 99 wt %, or about 100 wt % or greater, of the steam demand of the hydromethanation reaction.

The result of the hydromethanation reaction is a methane-enriched raw product, which is withdrawn from hydromethanation reactor (200) as methane-enriched raw product stream (50) typically comprising $CH_4$, $CO_2$, $H_2$, CO, $H_2S$, unreacted steam and, optionally, other contaminants such as entrained fines, $NH_3$, COS, HCN and/or elemental mercury vapor, depending on the nature of the carbonaceous material utilized for hydromethanation.

If the hydromethanation reaction is run in syngas balance, the methane-enriched raw product stream (50), upon exiting the hydromethanation reactor (200), will typically comprise at least about 15 mol %, or at least about 18 mol %, or at least about 20 mol %, methane based on the moles of methane, carbon dioxide, carbon monoxide and hydrogen in the methane-enriched raw product stream (50). In addition, the methane-enriched raw product stream (50) will typically comprise at least about 50 mol % methane plus carbon dioxide, based on the moles of methane, carbon dioxide, carbon monoxide and hydrogen in the methane-enriched raw product stream (50).

If the hydromethanation reaction is run in syngas excess, e.g., contains an excess of carbon monoxide and/or hydrogen above and beyond the syngas demand (for example, excess carbon monoxide and/or hydrogen are generated due to the amount of oxygen-rich gas stream (14) fed to hydromethanation reactor (200)), then there may be some dilution effect on the molar percent of methane and carbon dioxide in methane-enriched raw product stream (50).

The non-gaseous carbonaceous materials (10) useful in these processes include, for example, a wide variety of biomass and non-biomass materials. The carbonaceous feedstock (32) is derived from one or more non-gaseous carbonaceous materials (10), which are processed in a feedstock preparation section (100) as discussed below.

The hydromethanation catalyst (31) can comprise one or more catalyst species, as discussed below.

The carbonaceous feedstock (32) and the hydromethanation catalyst (31) are typically intimately mixed (i.e., to provide a catalyzed carbonaceous feedstock (31+32)) before provision to the hydromethanation reactor (200).

Further Gas Processing

Fines Removal

The hot gas effluent leaving the reaction chamber of the hydromethanation reactor (200) can pass through a fines remover unit (such as cyclone assembly (360)), incorporated into and/or external of the hydromethanation reactor (200), which serves as a disengagement zone. Particles too heavy to be entrained by the gas leaving the hydromethanation reactor (200) (i.e., fines) are returned to the hydromethanation reactor (200), for example, to the reaction chamber (e.g., fluidized bed (202)).

Residual entrained fines are substantially removed by any suitable device such as internal and/or external cyclone separators optionally followed by Venturi scrubbers. As discussed above, at least a portion of these fines may be returned to lower portion (202c) of fluidized bed (202) via recycle line (366), and/or upper portion (202b) of fluidized bed (202) via recycle line (364). Any remaining recovered fines can be processed to recover alkali metal catalyst, or directly recycled back to feedstock preparation as described in previously incorporated US2009/0217589A1.

Removal of a "substantial portion" of fines means that an amount of fines is removed from the resulting gas stream such that downstream processing is not adversely affected; thus, at least a substantial portion of fines should be removed. Some minor level of ultrafine material may remain in the resulting gas stream to the extent that downstream processing is not significantly adversely affected. Typically, at least about 90 wt %, or at least about 95 wt %, or at least about 98 wt %, of the fines of a particle size greater than about 20 µm, or greater than about 10 µm, or greater than about 5 µm, are removed.

Heat Exchange

Depending on the hydromethanation conditions, the fines-depleted methane-enriched raw product stream (52) can be generated having at a temperature ranging from about 1000° F. (about 538° C.) to about 1500° F. (about 816° C.), and more typically from about 1100° F. (about 593° C.) to about 1400° F. (about 760° C.), a pressure of from about 50 psig (about 446 kPa) to about 800 psig (about 5617 kPa), more typically from about 400 psig (about 2860 kPa) to about 600 psig (about 4238 kPa), and a velocity of from about 0.5 ft/sec (about 0.15 m/sec) to about 2.0 ft/sec (about 0.61 m/sec), more typically from about 1.0 ft/sec (0.30 m/sec) to about 1.5 ft/sec (about 0.46 m/sec).

Figure 2:
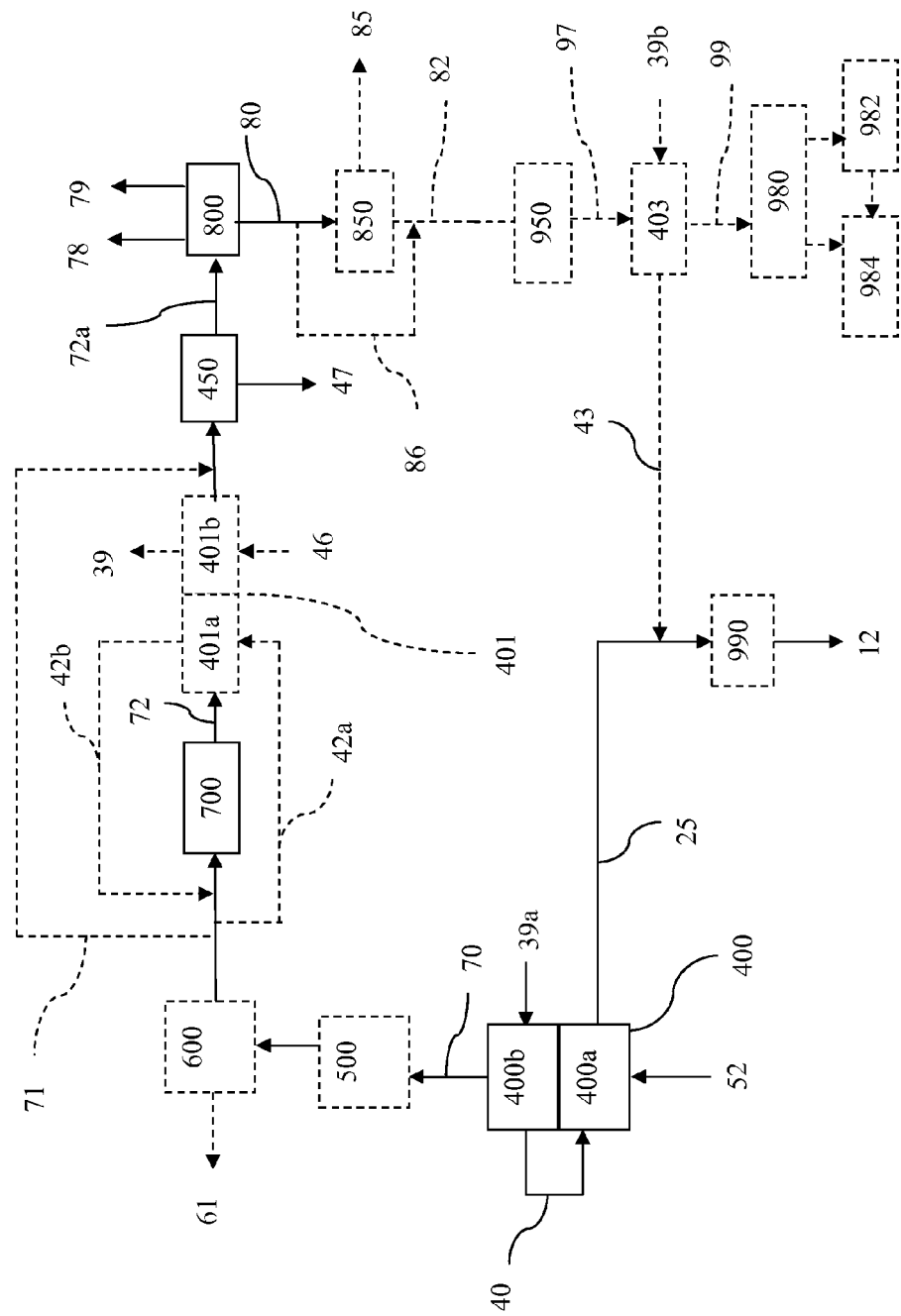
FIG. 2 is a diagram of an embodiment for the further processing of a methane-enriched raw product stream to generate one or more value-added products such as hydrogen, substitute natural gas and/or electrical power.

The fines-depleted methane-enriched raw product stream (52) can be, for example, provided to a heat recovery unit, e.g., first heat exchanger unit (400) as shown in FIG. 2. First heat exchanger unit (400) removes at least a portion of the heat energy from the fines-depleted methane-enriched raw product stream (52) and reduces the temperature of the fines-depleted methane-enriched raw product stream (52) to generate a cooled methane-enriched raw product stream (70) having a temperature less than the fines-depleted methane-enriched raw product stream (52). The heat energy recovered by second heat exchanger unit (400) can be used to generate a first process steam stream (40) of which at least a portion of the first process steam stream (40) can, for example, be fed back to the hydromethanation reactor (200).

In one embodiment, as depicted in FIG. 2, first heat exchanger unit (400) has both a steam boiler section (400b) preceded by a superheating section (400a). A stream of boiler feed water (39a) can be passed through steam boiler section (400b) to generate a first process steam stream (40), which is then passed through steam superheater (400a) to generate a superheated process steam stream (25) of a suitable temperature and pressure for introduction into hydromethanation reactor (200). Steam superheater (400a) can also be used to superheat other recycle steam streams (for example second process steam stream (43)) to the extent required for feeding into the hydromethanation reactor (200).

The resulting cooled methane-enriched raw product stream (70) will typically exit second heat exchanger unit (400) at a temperature ranging from about 450° F. (about 232° C.) to about 1100° F. (about 593° C.), more typically from about 550° F. (about 288° C.) to about 950° F. (about 510° C.), a pressure of from about 50 psig (about 446 kPa) to about 800 psig (about 5617 kPa), more typically from about 400 psig (about 2860 kPa) to about 600 psig (about 4238 kPa), and a velocity of from about 0.5 ft/sec (about 0.15 m/sec) to about 2.0 ft/sec (about 0.61 m/sec), more typically from about 1.0 ft/sec (0.30 m/sec) to about 1.5 ft/sec (about 0.46 m/sec).

Gas Purification

Product purification may comprise, for example, water-gas shift processes (700), dehydration (450) and acid gas removal (800), and optional trace contaminant removal (500) and optional ammonia removal and recovery (600).

Trace Contaminant Removal (500)

As is familiar to those skilled in the art, the contamination levels of the gas stream, e.g., cooled methane-enriched raw product stream (70), will depend on the nature of the carbonaceous material used for preparing the carbonaceous feedstocks. For example, certain coals, such as Illinois #6, can have high sulfur contents, leading to higher COS contamination; and other coals, such as Powder River Basin coals, can contain significant levels of mercury which can be volatilized in hydromethanation reactor (200).

COS can be removed from a gas stream, e.g. the cooled methane-enriched raw product stream (70), by COS hydrolysis (see, U.S. Pat. No. 3,966,875, U.S. Pat. No. 4,011,066, U.S. Pat. No. 4,100,256, U.S. Pat. No. 4,482,529 and U.S. Pat. No. 4,524,050), passing the gas stream through particulate limestone (see, U.S. Pat. No. 4,173,465), an acidic buffered $CuSO_4$ solution (see, U.S. Pat. No. 4,298,584), an alkanolamine absorbent such as methyldiethanolamine, triethanolamine, dipropanolamine or diisopropanolamine, containing tetramethylene sulfone (sulfolane, see, U.S. Pat. No. 3,989,811); or counter-current washing of the cooled second gas stream with refrigerated liquid $CO_2$ (see, U.S. Pat. No. 4,270,937 and U.S. Pat. No. 4,609,388).

HCN can be removed from a gas stream, e.g., the cooled methane-enriched raw product stream (70), by reaction with ammonium sulfide or polysulfide to generate $CO_2$, $H_2S$ and $NH_3$ (see, U.S. Pat. No. 4,497,784, U.S. Pat. No. 4,505,881 and U.S. Pat. No. 4,508,693), or a two stage wash with formaldehyde followed by ammonium or sodium polysulfide (see, U.S. Pat. No. 4,572,826), absorbed by water (see, U.S. Pat. No. 4,189,307), and/or decomposed by passing through alumina supported hydrolysis catalysts such as $MoO_3$, $TiO_2$ and/or $ZrO_2$ (see, U.S. Pat. No. 4,810,475, U.S. Pat. No. 5,660,807 and U.S. Pat. No. 5,968,465).

Elemental mercury can be removed from a gas stream, e.g., the cooled methane-enriched raw product stream (70), for example, by absorption by carbon activated with sulfuric acid (see, U.S. Pat. No. 3,876,393), absorption by carbon impregnated with sulfur (see, U.S. Pat. No. 4,491,609), absorption by a $H_2S$-containing amine solvent (see, U.S. Pat. No. 4,044,098), absorption by silver or gold impregnated zeolites (see, U.S. Pat. No. 4,892,567), oxidation to HgO with hydrogen peroxide and methanol (see, U.S. Pat. No. 5,670,122), oxidation with bromine or iodine containing compounds in the presence of $SO_2$ (see, U.S. Pat. No. 6,878,358), oxidation with a H, Cl and O— containing plasma (see, U.S. Pat. No. 6,969,494), and/or oxidation by a chlorine-containing oxidizing gas (e.g., ClO, see, U.S. Pat. No. 7,118,720).

When aqueous solutions are utilized for removal of any or all of COS, HCN and/or Hg, the waste water generated in the trace contaminants removal units can be directed to a waste water treatment unit (not depicted).

When present, a trace contaminant removal of a particular trace contaminant should remove at least a substantial portion (or substantially all) of that trace contaminant from the so-treated gas stream (e.g., cooled methane-enriched raw product stream (70)), typically to levels at or lower than the specification limits of the desired product stream. Typically, a trace contaminant removal should remove at least 90%, or at least 95%, or at least 98%, of COS, HCN and/or mercury from a cooled first gas stream, based on the weight of the contaminant in the prior to treatment.

Ammonia Removal and Recovery (600)

As is familiar to those skilled in the art, gasification of biomass, certain coals, certain petroleum cokes and/or utilizing air as an oxygen source for hydromethanation reactor (200) can produce significant quantities of ammonia in the product stream. Optionally, a gas stream, e.g. the cooled methane-enriched raw product stream (70), can be scrubbed by water in one or more ammonia removal and recovery units (600) to remove and recover ammonia.

The ammonia recovery treatment may be performed, for example, on the cooled methane-enriched raw product stream (70), directly from heat exchanger (400) or after treatment in one or both of (i) one or more of the trace contaminants removal units (500), and (ii) one or more sour shift units (700).

After scrubbing, the gas stream, e.g., the cooled methane-enriched raw product stream (70), will typically comprise at least $H_2S$, $CO_2$, CO, $H_2$ and $CH_4$. When the cooled methane-enriched raw product stream (70) has previously passed through a sour shift unit (700), then, after scrubbing, the gas stream will typically comprise at least $H_2S$, $CO_2$, $H_2$ and $CH_4$.

Ammonia can be recovered from the scrubber water according to methods known to those skilled in the art, can typically be recovered as an aqueous solution (61) (e.g., 20 wt %). The waste scrubber water can be forwarded to a waste water treatment unit (not depicted).

When present, an ammonia removal process should remove at least a substantial portion (and substantially all) of the ammonia from the scrubbed stream, e.g., the cooled methane-enriched raw product stream (70). "Substantial" removal in the context of ammonia removal means removal of a high enough percentage of the component such that a desired end product can be generated. Typically, an ammonia removal process will remove at least about 95%, or at least about 97%, of the ammonia content of a scrubbed first gas stream, based on the weight of ammonia in the stream prior to treatment.

Water-Gas Shift (700)

A portion or all of the methane-enriched raw product stream (e.g., cooled methane-enriched raw product stream (70)) is supplied to a water-gas shift reactor, such as sour shift reactor (700).

In sour shift reactor (700), the gases undergo a sour shift reaction (also known as a water-gas shift reaction) in the presence of an aqueous medium (such as steam) to convert at least a predominant portion (or a substantial portion, or substantially all) of the CO to $CO_2$ and to increase the fraction of $H_2$. The generation of increased hydrogen content is utilized, for example, to optimize hydrogen production, or to otherwise optimize $H_2$/CO ratios for downstream methanation.

The water-gas shift treatment may be performed on the cooled methane-enriched raw product stream (70) passed directly from heat exchanger (400), or on the cooled methane-enriched raw product stream (70) that has passed through a trace contaminants removal unit (500) and/or an ammonia removal unit (600).

A sour shift process is described in detail, for example, in U.S. Pat. No. 7,074,373. The process involves adding water, or using water contained in the gas, and reacting the resulting water-gas mixture adiabatically over a steam reforming catalyst. Typical steam reforming catalysts include one or more Group VIII metals on a heat-resistant support.

Methods and reactors for performing the sour gas shift reaction on a CO-containing gas stream are well known to those of skill in the art. Suitable reaction conditions and suitable reactors can vary depending on the amount of CO that must be depleted from the gas stream. In some embodiments, the sour gas shift can be performed in a single stage within a temperature range from about 100° C., or from about 150° C., or from about 200° C., to about 250° C., or to about 300° C., or to about 350° C. In these embodiments, the shift reaction can be catalyzed by any suitable catalyst known to those of skill in the art. Such catalysts include, but are not limited to, $Fe_2O_3$-based catalysts, such as $Fe_2O_3$—$Cr_2O_3$ catalysts, and other transition metal-based and transition metal oxide-based catalysts. In other embodiments, the sour gas shift can be performed in multiple stages. In one particular embodiment, the sour gas shift is performed in two stages. This two-stage process uses a high-temperature sequence followed by a low-temperature sequence. The gas temperature for the high-temperature shift reaction ranges from about 350° C. to about 1050° C. Typical high-temperature catalysts include, but are not limited to, iron oxide optionally combined with lesser amounts of chromium oxide. The gas temperature for the low-temperature shift ranges from about 150° C. to about 300° C., or from about 200° C. to about 250° C. Low-temperature shift catalysts include, but are not limited to, copper oxides that may be supported on zinc oxide or alumina. Suitable methods for the sour shift process are described in previously incorporated US2009/0246120A1.

The sour shift reaction is exothermic so it is often carried out with a heat exchanger, such as second heat exchanger unit (401), to permit the efficient use of heat energy. Shift reactors employing these features are well known to those of skill in the art. An example of a suitable shift reactor is illustrated in previously incorporated U.S. Pat. No. 7,074,373, although other designs known to those of skill in the art are also effective.

Following the sour gas shift procedure, the resulting hydrogen-enriched raw product stream (72) generally contains $CH_4$, $CO_2$, $H_2$, $H_2S$, steam, optionally CO and optionally minor amounts of other contaminants.

As indicated above, the hydrogen-enriched raw product stream (72) can be provided to a heat recovery unit, e.g., second heat exchanger unit (401). While second heat exchanger unit (401) is depicted in FIG. 2 as a separate unit, it can exist as such and/or be integrated into the sour shift reactor (700), thus being capable of cooling the sour shift reactor (700) and removing at least a portion of the heat energy from the hydrogen-enriched raw product stream (72) to reduce the temperature and generate a cooled stream.

At least a portion of the recovered heat energy can be used to generate a second process steam stream from a water/steam source.

In a specific embodiment as depicted in FIG. 2, the hydrogen-enriched raw product stream (72), upon exiting sour shift reactor (700), is introduced into a superheater (401*a*) followed by a boiler feed water preheater (401*b*). Superheater (401*a*) can be used, for example, to superheat a stream (42*a*) which can be a portion of cooled methane-enriched raw product stream (70), to generate a superheated stream (42*b*) which is then recombined into cooled methane-enriched raw product stream (70). Alternatively, all of cooled methane-enriched product stream can be preheated in superheater (401*a*) and subsequently fed into sour shift reactor (700) as superheated stream (42*b*). Boiler feed water preheater (401*b*) can be used, for example, to preheat boiler feed water (46) to generate a preheated boiler water feed stream (39) for one or more of first heat exchanger unit (400) and third heat exchanger unit (403), as well as other steam generation operations.

If it is desired to retain some of the carbon monoxide content of the methane-enriched raw product stream (50), a gas bypass loop (71) in communication with the first heat recovery unit (400) can be provided to allow some of the cooled methane-enriched raw product stream (70) exiting the first heat exchanger unit (400) to bypass the sour shift reactor (700) and second heat exchanger unit (401) altogether, and be combined with hydrogen-enriched raw product stream (72) at some point prior to dehydration unit (450) and/or acid gas removal unit (800). This is particularly useful when it is desired to recover a separate methane product, as the retained carbon monoxide can be subsequently methanated as discussed below.

Dehydration (450)

Subsequent to sour shift reactor (700) and second heat exchanger unit (401), and prior to acid gas removal unit (800), the hydrogen-enriched raw product stream (72) is typically treated to reduce water content in via a knock-out drum or similar water separation device (450). A resulting waste water stream (47) (which will be a sour water stream) can be sent to a wastewater treatment unit (not depicted) for further processing. The resulting dehydrated hydrogen-enriched raw product stream (72a) is sent to acid gas removal unit (800) as discussed below.

Acid Gas Removal (800)

A subsequent acid gas removal unit (800) is used to remove a substantial portion of $H_2S$ and a substantial portion of $CO_2$ from the dehydrated hydrogen-enriched raw product stream (72a) and generate a sweetened gas stream (80).

Acid gas removal processes typically involve contacting a gas stream with a solvent such as monoethanolamine, diethanolamine, methyldiethanolamine, diisopropylamine, diglycolamine, a solution of sodium salts of amino acids, methanol, hot potassium carbonate or the like to generate $CO_2$ and/or $H_2S$ laden absorbers. One method can involve the use of Selexol® (UOP LLC, Des Plaines, Ill. USA) or Rectisol® (Lurgi A G, Frankfurt am Main, Germany) solvent having two trains; each train containing an $H_2S$ absorber and a $CO_2$ absorber.

One method for removing acid gases is described in previously incorporated US2009/0220406A1.

At least a substantial portion (e.g., substantially all) of the $CO_2$ and/or $H_2S$ (and other remaining trace contaminants) should be removed via the acid gas removal processes. "Substantial" removal in the context of acid gas removal means removal of a high enough percentage of the component such that a desired end product can be generated. The actual amounts of removal may thus vary from component to component. For "pipeline-quality natural gas", only trace amounts (at most) of $H_2S$ can be present, although higher (but still small) amounts of $CO_2$ may be tolerable.

Typically, at least about 85%, or at least about 90%, or at least about 92%, of the $CO_2$ should be removed from the dehydrated hydrogen-enriched raw product stream (72a). Typically, at least about 95%, or at least about 98%, or at least about 99.5%, of the $H_2S$, should be removed from the dehydrated hydrogen-enriched raw product stream (72a).

Losses of desired product (hydrogen and/or methane) in the acid gas removal step should be minimized such that the sweetened gas stream (80) comprises at least a substantial portion (and substantially all) of the methane and hydrogen from the dehydrated hydrogen-enriched raw product stream (72a). Typically, such losses should be about 2 mol % or less, or about 1.5 mol % or less, or about 1 mol % of less, respectively, of the methane and hydrogen from the dehydrated hydrogen-enriched raw product stream (72a).

The resulting sweetened gas stream (80) will generally comprise $CH_4$, $H_2$ and optionally CO (for the downstream methanation), and typically small amounts of $CO_2$ and $H_2O$.

Any recovered $H_2S$ (78) from the acid gas removal (and other processes such as sour water stripping) can be converted to elemental sulfur by any method known to those skilled in the art, including the Claus process. Sulfur can be recovered as a molten liquid.

Any recovered $CO_2$ (79) from the acid gas removal can be compressed for transport in $CO_2$ pipelines, industrial use, and/or sequestration for storage or other processes such as enhanced oil recovery.

The resulting sweetened gas stream (80) may, for example, be utilized directly as a medium/high BTU fuel source, or as a feed for a fuel cell such as disclosed in previously incorporated US2011/0207002A1 and US2011/0217602A1, or further processed as described below.

Hydrogen Separation Unit (850)

Hydrogen may be separated from the sweetened gas stream (80) according to methods known to those skilled in the art, such as cryogenic distillation, the use of molecular sieves, gas separation (e.g., ceramic) membranes, and/or pressure swing adsorption (PSA) techniques. See, for example, previously incorporated US2009/0259080A1.

In one embodiment, a PSA device is utilized for hydrogen separation. PSA technology for separation of hydrogen from gas mixtures containing methane (and optionally carbon monoxide) is in general well-known to those of ordinary skill in the relevant art as disclosed, for example, in U.S. Pat. No. 6,379,645 (and other citations referenced therein). PSA devices are generally commercially available, for example, based on technologies available from Air Products and Chemicals Inc. (Allentown, Pa.), UOP LLC (Des Plaines, Ill.) and others.

In another embodiment, a hydrogen membrane separator can be used followed by a PSA device.

Such separation provides a high-purity hydrogen product stream (85) and a hydrogen-depleted sweetened gas stream (82).

The recovered hydrogen product stream (85) preferably has a purity of at least about 99 mole %, or at least 99.5 mole %, or at least about 99.9 mole %.

The hydrogen product stream (85) can be used, for example, as an energy source and/or as a reactant. For example, the hydrogen can be used as an energy source for hydrogen-based fuel cells, for power and/or steam generation (see 980, 982 and 984 in FIG. 2), and/or for a subsequent hydromethanation process. The hydrogen can also be used as a reactant in various hydrogenation processes, such as found in the chemical and petroleum refining industries.

The hydrogen-depleted sweetened gas stream (82) will comprise substantially methane, with optional minor amounts of carbon monoxide (depending primarily on the extent of the sour shift reaction and bypass), carbon dioxide (depending primarily on the effectiveness of the acid gas removal process) and hydrogen (depending primarily on the extent and effectiveness of the hydrogen separation technology). The hydrogen-depleted sweetened gas stream (82) can be utilized directly, and/or can be further processed/utilized as described below.

Methanation (950)

All or a portion of sweetened gas stream (80) or hydrogen-depleted sweetened gas stream (82) may be used directly as a methane product stream (99), or all or a portion of those streams may be further processed/purified to produce methane product stream (99).

In one embodiment, sweetened gas stream (80) or hydrogen-depleted sweetened gas stream (82) is fed to a trim methanator (950) to generate additional methane from the carbon monoxide and hydrogen that may be present in those streams, resulting in a methane-enriched product stream (97).

If a hydrogen separation unit (850) is present, a portion of sweetened gas stream (80) may bypass hydrogen separation unit (850) via bypass line (86) to adjust the hydrogen content of hydrogen-depleted sweetened gas stream (82) to optimize the $H_2$/CO ratio for methanation.

The methanation reaction can be carried out in any suitable reactor, e.g., a single-stage methanation reactor, a series of single-stage methanation reactors or a multistage reactor. Methanation reactors include, without limitation, fixed bed, moving bed or fluidized bed reactors. See, for instance, U.S. Pat. No. 3,958,957, U.S. Pat. No. 4,252,771, U.S. Pat. No. 3,996,014 and U.S. Pat. No. 4,235,044. Methanation reactors and catalysts are generally commercially available. The catalyst used in the methanation, and methanation conditions, are generally known to those of ordinary skill in the relevant art, and will depend, for example, on the temperature, pressure, flow rate and composition of the incoming gas stream.

As the methanation reaction is highly exothermic, in various embodiments the methane-enriched product gas stream (97) may be, for example, further provided to a heat recovery unit, e.g., third heat exchanger unit (403). While third heat exchanger unit (403) is depicted as a separate unit, it can exist as such and/or be integrated into methanator (950), thus being capable of cooling the methanator unit and removing at least a portion of the heat energy from the methane-enriched gas stream to reduce the temperature of the methane-enriched gas stream. The recovered heat energy can be utilized to generate a second process steam stream (43) from a water and/or steam source (39b). Although not depicted as such in FIG. 2, third heat exchanger unit (403) may comprise a superheating section followed by a boiler section such as previously described for first heat exchanger unit (400). Because of the highly exothermic nature of the methanation reaction, second process stream (43) will typically not require further superheating, and all or a portion may be combined with all or a portion superheated process steam stream (25) for use as superheated steam stream (12). If necessary, however, a superheater (990) may be used to superheat superheated steam stream (12) to the desired temperature for feeding into hydromethanation reactor (200).

Methane-enriched product gas stream (97) can be utilized as methane product stream (99) or, it can be further processed, when necessary, to separate and recover $CH_4$ by any suitable gas separation method known to those skilled in the art including, but not limited to, cryogenic distillation and the use of molecular sieves or gas separation (e.g., ceramic) membranes. Additional gas purification methods include, for example, the generation of methane hydrate as disclosed in previously incorporated US2009/0260287A1, US2009/0259080A1 and US2009/0246120A1.

Pipeline-Quality Natural Gas

The invention provides processes and systems that, in certain embodiments, are capable of generating "pipeline-quality natural gas" (or "pipeline-quality substitute natural gas") from the hydromethanation of non-gaseous carbonaceous materials. A "pipeline-quality natural gas" typically refers to a methane-containing stream that is (1) within ±5% of the heating value of pure methane (whose heating value is 1010 btu/ft$^3$ under standard atmospheric conditions), (2) substantially free of water (typically a dew point of about −40° C. or less), and (3) substantially free of toxic or corrosive contaminants. In some embodiments of the invention, the methane product stream (99) described in the above processes satisfies such requirements.

Waste Water Treatment

Residual contaminants in waste water resulting from any one or more of the trace contaminant removal, sour shift, ammonia removal, acid gas removal and/or catalyst recovery processes can be removed in a waste water treatment unit to allow recycling of the recovered water within the plant and/or disposal of the water from the plant process according to any methods known to those skilled in the art. Depending on the feedstock and reaction conditions, such residual contaminants can comprise, for example, aromatics, CO, $CO_2$, $H_2S$, COS, HCN, ammonia, and mercury. For example, $H_2S$ and HCN can be removed by acidification of the waste water to a pH of about 3, treating the acidic waste water with an inert gas in a stripping column, and increasing the pH to about 10 and treating the waste water a second time with an inert gas to remove ammonia (see U.S. Pat. No. 5,236,557). $H_2S$ can be removed by treating the waste water with an oxidant in the presence of residual coke particles to convert the $H_2S$ to insoluble sulfates which may be removed by flotation or filtration (see U.S. Pat. No. 4,478,425). Aromatics can be removed by contacting the waste water with a carbonaceous char optionally containing mono- and divalent basic inorganic compounds (e.g., the solid char product or the depleted char after catalyst recovery, supra) and adjusting the pH (see U.S. Pat. No. 4,113,615). Aromatics can also be removed by extraction with an organic solvent followed by treatment of the waste water in a stripping column (see U.S. Pat. No. 3,972,693, U.S. Pat. No. 4,025,423 and U.S. Pat. No. 4,162,902).

Process Steam

A steam feed loop can be provided for feeding the various process steam streams (e.g., 25/40 and 43) generated from heat energy recovery.

The process steam streams can be generated by contacting a water/steam source (such as (39a) and (39b)) with the heat energy recovered from the various process operations using one or more heat recovery units, such as first and third heat exchanger units (400) and (403).

Any suitable heat recovery unit known in the art may be used. For example, a steam boiler or any other suitable steam generator (such as a shell/tube heat exchanger) that can utilize the recovered heat energy to generate steam can be used. The heat exchangers may also function as superheaters for steam streams, such as (400a) in FIG. 2, so that heat recovery through one of more stages of the process can be used to superheat the steam to a desired temperature and pressure, thus eliminating the need for separate fuel fired superheaters.

While any water source can be used to generate steam, the water commonly used in known boiler systems is purified and deionized (about 0.3-1.0 μS/cm) so that corrosive processes are slowed.

In one embodiment of the present process, the hydromethanation reaction will have a steam demand (temperature, pressure and volume), and the amount of process steam and process heat recovery is sufficient to provide at least about 97 wt %, or at least about 98 wt %, or at least about 99 wt %, or at least about 100% of this total steam demand. If needed, the remaining about 3 wt % or less, or about 2 wt % or less, or about 1 wt % or less, can be supplied by a make-up steam stream, which can be fed into the system as (or as a part of) steam stream (12). In steady-state operation of the process, the process steam should be an amount of a sufficient temperature and pressure to meet the steam demand of the hydromethanation reaction.

If needed, a suitable steam boiler or steam generator can be used to provide the make-up steam stream. Such boilers can be powered, for example, through the use of any carbonaceous material such as powdered coal, biomass etc., and including but not limited to rejected carbonaceous materials from the feedstock preparation operations (e.g., fines, supra). In one embodiment, such an additional steam boiler/generator may be present, but is not used in steady state operation.

In another embodiment, the process steam stream or streams supply at least all of the total steam demand for the hydromethanation reaction, in which during steady state operation there is substantially no make-up steam stream.

In another embodiment, an excess of process steam is generated. The excess steam can be used, for example, for power generation via a steam turbine, and/or drying the carbonaceous feedstock in a fluid bed drier to a desired moisture content, as discussed below.

Power Generation

A portion of the methane product stream (99) can be utilized for combustion (980) and steam generation (982), as can a portion of any recovered hydrogen (85). As indicated above, excess recycle steam may be provided to one or more power generators (984), such as a combustion or steam turbine, to produce electricity which may be either utilized within the plant or can be sold onto the power grid.

Preparation of Carbonaceous Feedstocks

Carbonaceous Materials Processing (100)

Particulate carbonaceous materials, such as biomass and non-biomass, can be prepared via crushing and/or grinding, either separately or together, according to any methods known in the art, such as impact crushing and wet or dry grinding to yield one or more carbonaceous particulates. Depending on the method utilized for crushing and/or grinding of the carbonaceous material sources, the resulting carbonaceous particulates may be sized (i.e., separated according to size) to provide the carbonaceous feedstock (32) for use in catalyst loading processes (350) to form a catalyzed carbonaceous feedstock (31+32) for the hydromethanation reactor (200).

Any method known to those skilled in the art can be used to size the particulates. For example, sizing can be performed by screening or passing the particulates through a screen or number of screens. Screening equipment can include grizzlies, bar screens, and wire mesh screens. Screens can be static or incorporate mechanisms to shake or vibrate the screen. Alternatively, classification can be used to separate the carbonaceous particulates. Classification equipment can include ore sorters, gas cyclones, hydrocyclones, rake classifiers, rotating trommels or fluidized classifiers. The carbonaceous materials can be also sized or classified prior to grinding and/or crushing.

The carbonaceous particulate can be supplied as a fine particulate having an average particle size of from about 25 microns, or from about 45 microns, up to about 2500 microns, or up to about 500 microns. One skilled in the art can readily determine the appropriate particle size for the carbonaceous particulates. For example, when a fluidized bed reactor is used, such carbonaceous particulates can have an average particle size which enables incipient fluidization of the carbonaceous materials at the gas velocity used in the fluidized bed reactor. Desirable particle size ranges for the hydromethanation reactor (200) are in the Geldart A and Geldart B ranges (including overlap between the two), depending on fluidization conditions, typically with limited amounts of fine (below about 25 microns) and coarse (greater than about 250 microns) material.

Additionally, certain carbonaceous materials, for example, corn stover and switchgrass, and industrial wastes, such as saw dust, either may not be amenable to crushing or grinding operations, or may not be suitable for use as such, for example due to ultra fine particle sizes. Such materials may be formed into pellets or briquettes of a suitable size for crushing or for direct use in, for example, a fluidized bed reactor. Generally, pellets can be prepared by compaction of one or more carbonaceous material; see for example, previously incorporated US2009/0218424A1. In other examples, a biomass material and a coal can be formed into briquettes as described in U.S. Pat. No. 4,249,471, U.S. Pat. No. 4,152,119 and U.S. Pat. No. 4,225,457. Such pellets or briquettes can be used interchangeably with the preceding carbonaceous particulates in the following discussions.

Additional feedstock processing steps may be necessary depending on the qualities of carbonaceous material sources. Biomass may contain high moisture contents, such as green plants and grasses, and may require drying prior to crushing. Municipal wastes and sewages also may contain high moisture contents which may be reduced, for example, by use of a press or roll mill (e.g., U.S. Pat. No. 4,436,028). Likewise, non-biomass, such as high-moisture coal, can require drying prior to crushing. Some caking coals can require partial oxidation to simplify operation. Non-biomass feedstocks deficient in ion-exchange sites, such as anthracites or petroleum cokes, can be pre-treated to create additional ion-exchange sites to facilitate catalyst loading and/or association. Such pre-treatments can be accomplished by any method known to the art that creates ion-exchange capable sites and/or enhances the porosity of the feedstock (see, for example, previously incorporated U.S. Pat. No. 4,468,231 and GB1599932). Oxidative pre-treatment can be accomplished using any oxidant known to the art.

The ratio and types of the carbonaceous materials in the carbonaceous particulates can be selected based on technical considerations, processing economics, availability, and proximity of the non-biomass and biomass sources. The availability and proximity of the sources for the carbonaceous materials can affect the price of the feeds, and thus the overall production costs of the catalytic gasification process. For example, the biomass and the non-biomass materials can be blended in at about 5:95, about 10:90, about 15:85, about 20:80, about 25:75, about 30:70, about 35:65, about 40:60, about 45:55, about 50:50, about 55:45, about 60:40, about 65:35, about 70:20, about 75:25, about 80:20, about 85:15, about 90:10, or about 95:5 by weight on a wet or dry basis, depending on the processing conditions.

Significantly, the carbonaceous material sources, as well as the ratio of the individual components of the carbonaceous particulates, for example, a biomass particulate and a non-biomass particulate, can be used to control other material characteristics of the carbonaceous particulates. Non-biomass materials, such as coals, and certain biomass materials, such as rice hulls, typically include significant quantities of inorganic matter including calcium, alumina and silica which form inorganic oxides (i.e., ash) in the catalytic gasifier. At temperatures above about 500° C. to about 600° C., potassium and other alkali metals can react with the alumina and silica in ash to form insoluble alkali aluminosilicates. In this form, the alkali metal is substantially water-insoluble and inactive as a catalyst. To prevent buildup of the residue in the hydromethanation reactor (200), a solid purge of by-product char (58) (and (58a)) comprising ash, unreacted carbonaceous material, and various other compounds (such as alkali metal compounds, both water soluble and water insoluble) is routinely withdrawn.

In preparing the carbonaceous particulates, the ash content of the various carbonaceous materials can be selected to be, for example, about 20 wt % or less, or about 15 wt % or less, or about 10 wt % or less, or about 5 wt % or less, depending on, for example, the ratio of the various carbonaceous materials and/or the starting ash in the various carbonaceous materials. In other embodiments, the resulting the carbonaceous particulates can comprise an ash content ranging from about 5 wt %, or from about 10 wt %, to about 20 wt %, or to about 15 wt %, based on the weight of the carbonaceous particulate. In other embodiments, the ash content of the carbonaceous particulate can comprise less than about 20 wt %, or less than about 15 wt %, or less than about 10 wt %, or less than about 8 wt %, or less than about 6 wt % alumina, based on the weight of the ash. In certain embodiments, the carbonaceous particulates can comprise an ash content of less than about 20 wt %, based on the weight of processed feedstock where the ash content of the carbonaceous particulate comprises less than about 20 wt % alumina, or less than about 15 wt % alumina, based on the weight of the ash.

Such lower alumina values in the carbonaceous particulates allow for, ultimately, decreased losses of catalysts, and particularly alkali metal catalysts, in the hydromethanation portion of the process. As indicated above, alumina can react with alkali source to yield an insoluble char comprising, for example, an alkali aluminate or aluminosilicate. Such insoluble char can lead to decreased catalyst recovery (i.e., increased catalyst loss), and thus, require additional costs of make-up catalyst in the overall process.

Additionally, the resulting carbonaceous particulates can have a significantly higher % carbon, and thus btu/lb value and methane product per unit weight of the carbonaceous particulate. In certain embodiments, the resulting carbonaceous particulates can have a carbon content ranging from about 75 wt %, or from about 80 wt %, or from about 85 wt %, or from about 90 wt %, up to about 95 wt %, based on the combined weight of the non-biomass and biomass.

In one example, a non-biomass and/or biomass is wet ground and sized (e.g., to a particle size distribution of from about 25 to about 2500 μm) and then drained of its free water (i.e., dewatered) to a wet cake consistency. Examples of suitable methods for the wet grinding, sizing, and dewatering are known to those skilled in the art; for example, see previously incorporated US2009/0048476A1. The filter cakes of the non-biomass and/or biomass particulates formed by the wet grinding in accordance with one embodiment of the present disclosure can have a moisture content ranging from about 40% to about 60%, or from about 40% to about 55%, or below 50%. It will be appreciated by one of ordinary skill in the art that the moisture content of dewatered wet ground carbonaceous materials depends on the particular type of carbonaceous materials, the particle size distribution, and the particular dewatering equipment used. Such filter cakes can be thermally treated, as described herein, to produce one or more reduced moisture carbonaceous particulates.

Each of the one or more carbonaceous particulates can have a unique composition, as described above. For example, two carbonaceous particulates can be utilized, where a first carbonaceous particulate comprises one or more biomass materials and the second carbonaceous particulate comprises one or more non-biomass materials. Alternatively, a single carbonaceous particulate comprising one or more carbonaceous materials utilized.

Catalyst Loading for Hydromethanation (350)

The hydromethanation catalyst is potentially active for catalyzing at least reactions (I), (II) and (III) described above. Such catalysts are in a general sense well known to those of ordinary skill in the relevant art and may include, for example, alkali metals, alkaline earth metals and transition metals, and compounds and complexes thereof. Typically, the hydromethanation catalyst comprises at least an alkali metal, such as disclosed in many of the previously incorporated references.

For the hydromethanation reaction, the one or more carbonaceous particulates are typically further processed to associate at least one hydromethanation catalyst, typically comprising a source of at least one alkali metal, to generate a catalyzed carbonaceous feedstock (31+32). If a liquid carbonaceous material is used, the hydromethanation catalyst may for example be intimately mixed into the liquid carbonaceous material.

The carbonaceous particulate provided for catalyst loading can be either treated to form a catalyzed carbonaceous feedstock (31+32) which is passed to the hydromethanation reactor (200), or split into one or more processing streams, where at least one of the processing streams is associated with a hydromethanation catalyst to form at least one catalyst-treated feedstock stream. The remaining processing streams can be, for example, treated to associate a second component therewith. Additionally, the catalyst-treated feedstock stream can be treated a second time to associate a second component therewith. The second component can be, for example, a second hydromethanation catalyst, a co-catalyst, or other additive.

In one example, the primary hydromethanation catalyst (alkali metal compound) can be provided to the single carbonaceous particulate (e.g., a potassium and/or sodium source), followed by a separate treatment to provide one or more co-catalysts and additives (e.g., a calcium source) to the same single carbonaceous particulate to yield the catalyzed carbonaceous feedstock (31+32). For example, see previously incorporated US2009/0217590A1 and US2009/0217586A1.

The hydromethanation catalyst and second component can also be provided as a mixture in a single treatment to the single second carbonaceous particulate to yield the catalyzed carbonaceous feedstock (31+32).

When one or more carbonaceous particulates are provided for catalyst loading, then at least one of the carbonaceous particulates is associated with a hydromethanation catalyst to form at least one catalyst-treated feedstock stream. Further, any of the carbonaceous particulates can be split into one or more processing streams as detailed above for association of a second or further component therewith. The resulting streams can be blended in any combination to provide the catalyzed carbonaceous feedstock (31+32), provided at least one catalyst-treated feedstock stream is utilized to form the catalyzed feedstock stream.

In one embodiment, at least one carbonaceous particulate is associated with a hydromethanation catalyst and optionally, a second component. In another embodiment, each carbonaceous particulate is associated with a hydromethanation catalyst and optionally, a second component.

Any methods known to those skilled in the art can be used to associate one or more hydromethanation catalysts with any of the carbonaceous particulates and/or processing streams. Such methods include but are not limited to, admixing with a solid catalyst source and impregnating the catalyst onto the processed carbonaceous material. Several impregnation methods known to those skilled in the art can be employed to incorporate the hydromethanation catalysts. These methods include but are not limited to, incipient wetness impregnation, evaporative impregnation, vacuum impregnation, dip impregnation, ion exchanging, and combinations of these methods.

In one embodiment, an alkali metal hydromethanation catalyst can be impregnated into one or more of the carbonaceous particulates and/or processing streams by slurrying with a solution (e.g., aqueous) of the catalyst in a loading tank. When slurried with a solution of the catalyst and/or co-catalyst, the resulting slurry can be dewatered to provide a catalyst-treated feedstock stream, again typically, as a wet cake. The catalyst solution can be prepared from any catalyst source in the present processes, including fresh or make-up catalyst and recycled catalyst or catalyst solution. Methods for dewatering the slurry to provide a wet cake of the catalyst-treated feedstock stream include filtration (gravity or vacuum), centrifugation, and a fluid press.

In another embodiment, as disclosed in previously incorporated US2010/0168495A1, the carbonaceous particulates are combined with an aqueous catalyst solution to generate a substantially non-draining wet cake, then mixed under elevated temperature conditions and finally dried to an appropriate moisture level.

One particular method suitable for combining a coal particulate and/or a processing stream comprising coal with a hydromethanation catalyst to provide a catalyst-treated feedstock stream is via ion exchange as described in previously incorporated US2009/0048476A1 and US2010/0168494A1. Catalyst loading by ion exchange mechanism can be maximized based on adsorption isotherms specifically developed for the coal, as discussed in the incorporated reference. Such loading provides a catalyst-treated feedstock stream as a wet cake. Additional catalyst retained on the ion-exchanged particulate wet cake, including inside the pores, can be controlled so that the total catalyst target value can be obtained in a controlled manner. The total amount of catalyst loaded can be controlled by controlling the concentration of catalyst components in the solution, as well as the contact time, temperature and method, as disclosed in the aforementioned incorporated references, and as can otherwise be readily determined by those of ordinary skill in the relevant art based on the characteristics of the starting coal.

In another example, one of the carbonaceous particulates and/or processing streams can be treated with the hydromethanation catalyst and a second processing stream can be treated with a second component (see previously incorporated US2007/0000177A1).

The carbonaceous particulates, processing streams, and/or catalyst-treated feedstock streams resulting from the preceding can be blended in any combination to provide the catalyzed second carbonaceous feedstock, provided at least one catalyst-treated feedstock stream is utilized to form the catalyzed carbonaceous feedstock (31+32). Ultimately, the catalyzed carbonaceous feedstock (31+32) is passed onto the hydromethanation reactor(s) (200).

Generally, each catalyst loading unit comprises at least one loading tank to contact one or more of the carbonaceous particulates and/or processing streams with a solution comprising at least one hydromethanation catalyst, to form one or more catalyst-treated feedstock streams. Alternatively, the catalytic component may be blended as a solid particulate into one or more carbonaceous particulates and/or processing streams to form one or more catalyst-treated feedstock streams.

Typically, when the hydromethanation catalyst is solely or substantially an alkali metal, it is present in the catalyzed carbonaceous feedstock in an amount sufficient to provide a ratio of alkali metal atoms to carbon atoms in the catalyzed carbonaceous feedstock ranging from about 0.01, or from about 0.02, or from about 0.03, or from about 0.04, to about 0.10, or to about 0.08, or to about 0.07, or to about 0.06.

With some feedstocks, the alkali metal component may also be provided within the catalyzed carbonaceous feedstock to achieve an alkali metal content of from about 3 to about 10 times more than the combined ash content of the carbonaceous material in the catalyzed carbonaceous feedstock, on a mass basis.

Suitable alkali metals are lithium, sodium, potassium, rubidium, cesium, and mixtures thereof. Particularly useful are potassium sources. Suitable alkali metal compounds include alkali metal carbonates, bicarbonates, formates, oxalates, amides, hydroxides, acetates, or similar compounds. For example, the catalyst can comprise one or more of sodium carbonate, potassium carbonate, rubidium carbonate, lithium carbonate, cesium carbonate, sodium hydroxide, potassium hydroxide, rubidium hydroxide or cesium hydroxide, and particularly, potassium carbonate and/or potassium hydroxide.

Optional co-catalysts or other catalyst additives may be utilized, such as those disclosed in the previously incorporated references.

The one or more catalyst-treated feedstock streams that are combined to form the catalyzed carbonaceous feedstock typically comprise greater than about 50%, greater than about 70%, or greater than about 85%, or greater than about 90% of the total amount of the loaded catalyst associated with the catalyzed carbonaceous feedstock (31+32). The percentage of total loaded catalyst that is associated with the various catalyst-treated feedstock streams can be determined according to methods known to those skilled in the art.

Separate carbonaceous particulates, catalyst-treated feedstock streams, and processing streams can be blended appropriately to control, for example, the total catalyst loading or other qualities of the catalyzed carbonaceous feedstock (31+32), as discussed previously. The appropriate ratios of the various stream that are combined will depend on the qualities of the carbonaceous materials comprising each as well as the desired properties of the catalyzed carbonaceous feedstock (31+32). For example, a biomass particulate stream and a catalyzed non-biomass particulate stream can be combined in such a ratio to yield a catalyzed carbonaceous feedstock (31+32) having a predetermined ash content, as discussed previously.

Any of the preceding catalyst-treated feedstock streams, processing streams, and processed feedstock streams, as one or more dry particulates and/or one or more wet cakes, can be combined by any methods known to those skilled in the art including, but not limited to, kneading, and vertical or horizontal mixers, for example, single or twin screw, ribbon, or drum mixers. The resulting catalyzed carbonaceous feedstock (31+32) can be stored for future use or transferred to one or more feed operations for introduction into the hydromethanation reactor(s). The catalyzed carbonaceous feedstock can be conveyed to storage or feed operations according to any methods known to those skilled in the art, for example, a screw conveyer or pneumatic transport.

Further, excess moisture can be removed from the catalyzed carbonaceous feedstock (31+32). For example, the catalyzed carbonaceous feedstock (31+32) may be dried with a fluid bed slurry drier (i.e., treatment with superheated steam to vaporize the liquid), or the solution thermally evaporated or removed under a vacuum, or under a flow of an inert gas, to provide a catalyzed carbonaceous feedstock having a residual moisture content, for example, of about 10 wt % or less, or of about 8 wt % or less, or about 6 wt % or less, or about 5 wt % or less, or about 4 wt % or less. In such a case, steam generated from process heat recovery is desirably utilized.

In one embodiment of the present invention, as disclosed in commonly owned and previously incorporated U.S. patent application Ser. No. 13/284,160, entitled HYDROMETHANATION OF A CARBONACEOUS FEEDSTOCK, concurrently filed herewith), the carbonaceous feedstock as fed to the hydromethanation reactor contains an elevated moisture content of from greater than 10 wt %, or about 12 wt % or greater, or about 15 wt % or greater, to about 25 wt % or less, or to about 20 wt % or less (based on the total weight of the carbonaceous feedstock), to the extent that the carbonaceous feedstock is substantially free-flowing.

The term "substantially free-flowing" as used herein means the carbonaceous feedstock particulates do not agglomerate under feed conditions due to moisture content. Desirably, the moisture content of the carbonaceous feedstock particulates is substantially internally contained so that there is minimal (or no) surface moisture.

A suitable substantially free-flowing catalyzed carbonaceous feedstock (31+32) can be produced in accordance with the disclosures of previously incorporated US2010/0168494A1 and US2010/0168495A1, where the thermal treatment step (after catalyst application) referred to in those disclosures can be minimized (or even potentially eliminated).

Catalyst Recovery (300)

Reaction of the catalyzed carbonaceous feedstock (31+32) under the described conditions generally provides the fines-depleted methane-enriched raw product stream (52) and a solid char by-product (58) (and (58a)) from the hydromethanation reactor (200). The solid char by-product (58) typically comprises quantities of unreacted carbon, inorganic ash and entrained catalyst. The solid char by-product (58) can be removed from the hydromethanation reactor (200) for sampling, purging, and/or catalyst recovery via a char outlet.

The term "entrained catalyst" as used herein means chemical compounds comprising the catalytically active portion of the hydromethanation catalyst, e.g., alkali metal compounds present in the char by-product. For example, "entrained catalyst" can include, but is not limited to, soluble alkali metal compounds (such as alkali metal carbonates, alkali metal hydroxides and alkali metal oxides) and/or insoluble alkali compounds (such as alkali metal aluminosilicates). The nature of catalyst components associated with the char extracted are discussed, for example, in previously incorporated US2007/0277437A1, US2009/0165383A1, US2009/0165382A1, US2009/0169449A1 and US2009/0169448A1.

The solid char by-product is continuously or periodically withdrawn from the hydromethanation reactor (200) through a char outlet which can, for example, be a lock hopper system, although other methods are known to those skilled in the art. Methods for removing solid char product are well known to those skilled in the art. One such method taught by EP-A-0102828, for example, can be employed.

The char by-product (58) from the hydromethanation reactor (200) may be passed to a catalytic recovery unit (300), as described below. Such char by-product (58) may also be split into multiple streams, one of which may be passed to a catalyst recovery unit (300), and another stream which may be used, for example, as a methanation catalyst (as described in previously incorporated US2010/0121125A1) and not treated for catalyst recovery.

In certain embodiments, when the hydromethanation catalyst is an alkali metal, the alkali metal in the solid char by-product (58) can be recovered to produce a catalyst recycle stream (57), and any unrecovered catalyst can be compensated by a catalyst make-up stream (57) (see, for example, previously incorporated US2009/0165384A1). The more alumina plus silica that is in the feedstock, the more costly it is to obtain a higher alkali metal recovery.

In one embodiment, the solid char by-product (58) from the hydromethanation reactor (200) can be quenched with a recycle gas and water to extract a portion of the entrained catalyst. The recovered catalyst (57) can be directed to the catalyst loading unit (350) for reuse of the alkali metal catalyst. The depleted char (59) can, for example, be directed to any one or more of the feedstock preparation operations (100) for reuse in preparation of the catalyzed feedstock (via line (59a)), combusted to power one or more steam generators (such as disclosed in previously incorporated US2009/0165376A1)), or used as such in a variety of applications, for example, as an absorbent (such as disclosed in previously incorporated US2009/0217582A1).

Other particularly useful recovery and recycling processes are described in U.S. Pat. No. 4,459,138, as well as previously incorporated US2007/0277437A1 US2009/0165383A1, US2009/0165382A1, US2009/0169449A1 and US2009/0169448A1. Reference can be had to those documents for further process details.

The recycle of catalyst can be to one or a combination of catalyst loading processes. For example, all of the recycled catalyst can be supplied to one catalyst loading process, while another process utilizes only makeup catalyst. The levels of recycled versus makeup catalyst can also be controlled on an individual basis among catalyst loading processes.

The by-product char (58) can also be treated for recovery of other by-products, such as vanadium, in addition to catalyst recovery, as disclosed in previously incorporated U.S. patent application Ser. No. 13/094,438.

Multi-Train Processes

In the processes of the invention, each process may be performed in one or more processing units. For example, one or more hydromethanation reactors may be supplied with the carbonaceous feedstock from one or more catalyst loading and/or feedstock preparation unit operations. Similarly, the methane-enriched raw product streams generated by one or more hydromethanation reactors may be processed or purified separately or via their combination at various downstream points depending on the particular system configuration, as discussed, for example, in previously incorporated US2009/0324458A1, US2009/0324459A1, US2009/0324460A1, US2009/0324461A1 and US2009/0324462A1.

In certain embodiments, the processes utilize two or more hydromethanation reactors (e.g., 2-4 hydromethanation reactors). In such embodiments, the processes may contain divergent processing units (i.e., less than the total number of hydromethanation reactors) prior to the hydromethanation reactors for ultimately providing the catalyzed carbonaceous feedstock to the plurality of hydromethanation reactors, and/or convergent processing units (i.e., less than the total number of hydromethanation reactors) following the hydromethanation reactors for processing the plurality of methane-enriched raw product streams generated by the plurality of hydromethanation reactors.

When the systems contain convergent processing units, each of the convergent processing units can be selected to have a capacity to accept greater than a 1/n portion of the total feed stream to the convergent processing units, where n is the number of convergent processing units. Similarly, when the systems contain divergent processing units, each of the divergent processing units can be selected to have a capacity to accept greater than a 1/m portion of the total feed stream supplying the convergent processing units, where m is the number of divergent processing units.

Examples of Specific Embodiments

A specific embodiment of the process is one in which the process is a continuous process, in which steps (a), (b), (c) and (d), are operated in a continuous manner.

Another specific embodiment is on in which the superheated steam stream and oxygen-rich stream are mixed at or prior to introduction into the lower portion of the fluidized bed.

Another specific embodiment is one in which oxygen-rich gas stream (14) is supplied continuously to hydromethanation reactor (200), and the amount of oxygen provided is varied as a process control, for example, to control of the desired operating temperature of the hydromethanation reaction. As oxygen is supplied to the hydromethanation reactor, the resulting oxidation/combustion reaction (for example with carbon in the by-product char and fines) generates heat energy (as well as typically some amounts of carbon monoxide and hydrogen). The amount of oxygen supplied to the hydromethanation reactor can be increased or decreased to increase or decrease the combustion/oxidation and, consequently, the amount of heat energy being generated, in situ in the hydromethanation reactor.

Another specific embodiment is one where the methane-enriched raw product stream is introduced into a first heat exchanger unit to recover heat energy and generate a cooled methane-enriched raw product stream.

Another specific embodiment is one where the heat energy recovered in the first heat exchanger unit is used to generate a first process steam stream, and superheat the first process steam stream for use as all or a part of the superheated steam stream for introduction into the hydromethanation reactor.

Another specific embodiment is one where at least a portion of the carbon monoxide in the cooled methane-enriched raw product stream is steam shifted to generate heat energy and a hydrogen-enriched raw product stream.

Another specific embodiment is one where heat energy is recovered from the steam shifting, and at least a portion of the recovered heat energy is utilized to preheat boiler feed water for use in generating process steam.

Another specific embodiment is one where the hydrogen-enriched raw product stream is substantially dehydrated to generate a dehydrated hydrogen-enriched raw product stream.

Another specific embodiment is one where a substantial portion of the carbon dioxide and a substantial portion of the hydrogen sulfide are removed from the dehydrated hydrogen-enriched raw product stream to produce a sweetened gas stream comprising a substantial portion of the hydrogen, carbon monoxide (if present in the dehydrated hydrogen-enriched raw product stream) and methane from the dehydrated hydrogen-enriched raw product stream.

Another specific embodiment is one where a portion of hydrogen from the sweetened gas stream is separated to produce a hydrogen product stream and a hydrogen-depleted sweetened gas stream comprising methane, hydrogen and optionally carbon monoxide.

Another specific embodiment is one where carbon monoxide and hydrogen present in the sweetened gas stream (or hydrogen-depleted sweetened gas stream, if present) are reacted in a catalytic methanator in the presence of a methanation catalyst to produce heat energy and a methane-enriched sweetened gas stream.

Another specific embodiment is one where heat energy from the catalytic methanation is recovered and at least a portion of the recovered heat energy is utilized to generate and superheat a second process steam stream.

Another specific embodiment is one where the superheated steam stream substantially comprises (or alternatively only comprises) steam from the first process steam stream and the second process steam stream.

Another specific embodiment is one where the process is steam neutral or steam positive.

Another specific embodiment is one in which there is no fuel-fired superheater is used to superheat the steam fed to the hydromethanation reactor during steady-state operation of the process, which steam is superheated only through process heat recovery.

Another specific embodiment is one where the methane-enriched sweetened gas stream is recovered as a methane product stream.

Another specific embodiment is one where the methane product stream is a pipeline-quality natural gas.

Another specific embodiment is one where the target operating temperature of the hydromethanation reaction (step (b)) is at least about at least about 1000° F. (about 538° C.) to about 1500° F. (about 816° C.), as described above.

Another specific embodiment is one where the superheated steam stream is fed to the hydromethanation reactor at a temperature of from about 500° F. (about 260° C.) to about 950° F. (about 510° C.), as described above.

Another specific embodiment is one where the superheated steam stream and the oxygen-rich stream are combined for feeding into the lower portion of the fluidized bed of the hydromethanation reactor, and the temperature of the combined stream is from about from about 500° F. (about 260° C.) to about 900° F. (about 482° C.), as described above.

Another specific embodiment is one where the syngas demand is substantially satisfied (or satisfied) by in situ generation of syngas (step (c)); therefore, substantially no (or no) syngas is added to the hydromethanation reactor (except as may inherently be present in the carbonaceous feedstock or the fines stream fed back into the hydromethanation reactor).

Another specific embodiment is one where the steam demand is substantially satisfied (or satisfied) by steam in the superheated steam stream, the oxygen-rich gas stream and the fines stream that is recycled back to the hydromethanation reactor, as well as steam generated in situ from the carbonaceous feedstock.

Another specific embodiment is one where the heat demand is substantially satisfied (or satisfied) by in situ heat generation (step (c)), as all of the primary streams provided to the hydromethanation reactor (the steam stream, the oxygen-rich gas stream the carbonaceous feedstock/hydromethanation catalyst and fines recycle stream) are introduced at a temperature below the target operating temperature of the hydromethanation reactor.

Another specific embodiment is one where the carbonaceous feedstock is supplied to the hydromethanation at a feed location, a char by-product is generated by the reactions of steps (b) and (c), and char by-product is continuously or periodically withdrawn from the hydromethanation reactor at a withdrawal point above the feed point of the carbonaceous feedstock. In another embodiment, char by-product is periodically or continuously withdrawn from the upper portion of the fluidized bed.

Another specific embodiment is one where and at least a portion of the withdrawn by-product char is provided to a catalyst recovery operation. Recovered catalyst is then recycled and combined with makeup catalyst to meet the demands of the hydromethanation reaction.

Another specific embodiment is one where the carbonaceous feedstock (or the catalyzed carbonaceous feedstock) as fed to the hydromethanation reactor contains a moisture content of from greater than 10 wt %, or about 12 wt % or greater, or about 15 wt % or greater, to about 25 wt % or less, or to about 20 wt % or less (based on the total weight of the carbonaceous feedstock), to the extent that the carbonaceous feedstock is substantially free-flowing.

We claim:

1. A process for generating a methane-enriched raw product gas stream from a non-gaseous carbonaceous material, the process comprising the steps of:
   (a) supplying to a hydromethanation reactor
      (1) a carbonaceous feedstock derived from the non-gaseous carbonaceous material,
      (2) a hydromethanation catalyst,
      (3) a superheated steam stream and
      (4) an oxygen-rich gas stream, wherein the hydromethanation reactor comprises a fluidized bed having a upper portion above a lower portion, and a zone below the fluidized bed, said zone being separated from the fluidized bed by a divider, and wherein the superheated steam stream and the oxygen-rich gas stream are introduced into the lower portion of the fluidized bed;

(b) reacting a portion of the carbonaceous feedstock in the hydromethanation reactor in the presence of hydromethanation catalyst, carbon monoxide, hydrogen and steam at a target operating temperature of at least about 1000° F. (about 538° C.) to about 1400° F. (about 760° C.), to produce a methane-enriched raw gas and a solid by-product char, wherein the methane-enriched raw gas comprises methane, carbon monoxide, hydrogen, carbon dioxide, hydrogen sulfide, steam, heat energy and entrained fines; and (c) reacting a portion of the carbonaceous feedstock with oxygen to produce carbon monoxide, hydrogen and heat energy;

wherein:
(i) the reaction of step (b) predominates in the upper portion of the fluidized bed;
(ii) the reaction of step (c) predominates in the lower portion of the fluidized bed;
(iii) the carbonaceous feedstock is supplied to the hydromethanation reactor into the lower portion of the fluidized bed in close proximity to the divider, and
(iv) the methane-enriched raw product stream comprises at least about 18 mol % methane (based on the moles of methane, carbon dioxide, carbon monoxide and hydrogen in the methane-enriched raw product stream).

2. The process of claim 1, wherein the carbonaceous feedstock is supplied to the hydromethanation at a feed location, a char by-product is generated by the reactions of steps (b) and (c), and char by-product is continuously or periodically withdrawn from the hydromethanation reactor at a withdrawal point above the feed point of the carbonaceous feedstock.

3. The process of claim 2, wherein char by-product is periodically or continuously withdrawn from the upper portion of the fluidized bed.

4. The process of claim 1, wherein the carbonaceous feedstock as fed to the hydromethanation reactor contains a moisture content of from greater than 10 wt % to about 25 wt % (based on the total weight of the carbonaceous feedstock), to the extent that the carbonaceous feedstock is substantially free-flowing.

5. The process of claim 1, wherein the reaction of step (b) has a syngas demand and a heat demand, and the syngas demand, and the heat demand and syngas demand are substantially satisfied by the reaction of step (c).

6. The process of claim 1, wherein the reaction of step (b) has a steam demand, and the steam demand is substantially satisfied by steam in the superheated steam stream, the oxygen-rich gas stream and the fines stream fed into the lower portion of the fluidized bed, and steam generated from the carbonaceous feedstock.

7. The process of claim 1, wherein the superheated steam stream, the oxygen-rich gas stream, the carbonaceous feedstock and the hydromethanation catalyst are introduced into the hydromethanation reactor at a temperature below the target operating temperature of the reaction of step (b).

8. The process of claim 1, wherein the superheated steam stream is fed to the hydromethanation reactor at a temperature of from about 500° F. (about 260° C.) to about 950° F. (about 510° C.).

9. The process of claim 1, wherein the superheated steam stream and the oxygen-rich stream are combined for feeding into the lower portion of the fluidized bed of the hydromethanation reactor, and the temperature of the combined stream is from about from about 500° F. (about 260° C.) to about 900° F. (about 482° C.).

10. The process of claim 1, wherein the methane-enriched raw product stream is introduced into a first heat exchanger unit to recover heat energy and generate a cooled methane-enriched raw product stream.

11. The process of claim 10, wherein the heat energy recovered in the first heat exchanger unit is used to generate a first process steam stream, and superheat the first process steam stream for use as all or a part of the superheated steam stream for introduction into the hydromethanation reactor.

12. The process of claim 10, wherein at least a portion of the carbon monoxide in the cooled methane-enriched raw product stream is steam shifted to generate heat energy and a hydrogen-enriched raw product stream; the hydrogen-enriched raw product stream is substantially dehydrated to generate a dehydrated hydrogen-enriched raw product stream; a substantial portion of the carbon dioxide and a substantial portion of the hydrogen sulfide are removed from the dehydrated hydrogen-enriched raw product stream to produce a sweetened gas stream comprising a substantial portion of the hydrogen, carbon monoxide (if present in the dehydrated hydrogen-enriched raw product stream) and methane from the dehydrated hydrogen-enriched raw product stream; and carbon monoxide and hydrogen present in the sweetened gas stream are reacted in a catalytic methanator in the presence of a methanation catalyst to produce heat energy and a methane-enriched sweetened gas stream.

13. The process of claim 12, wherein heat energy is recovered from the steam shifting, and at least a portion of the recovered heat energy is utilized to preheat boiler feed water for use in generating process steam.

14. The process of claim 12, wherein heat energy from the catalytic methanation is recovered and at least a portion of the recovered heat energy is utilized to generate and superheat a second process steam stream.

15. The process of claim 14, wherein the heat energy recovered in the first heat exchanger unit is used to generate a first process steam stream, and superheat the first process steam stream for use as all or a part of the superheated steam stream for introduction into the hydromethanation reactor.

16. The process of claim 15, wherein the superheated steam stream substantially comprises steam from the first process steam stream and the second process steam stream.

17. The process of claim 15, wherein the process is steam neutral or steam positive.

18. The process of claim 1, wherein there is no fuel-fired superheater used to superheat the steam fed to the hydromethanation reactor during steady-state operation of the process.

* * * * *